US012614760B2

(12) United States Patent
Maruhashi et al.

(10) Patent No.: US 12,614,760 B2
(45) Date of Patent: Apr. 28, 2026

(54) SECONDARY BATTERY AND METHOD OF PRODUCING SAME

(71) Applicant: ZEON CORPORATION, Tokyo (JP)

(72) Inventors: Yutaka Maruhashi, Tokyo (JP); Masuhiro Onishi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 688 days.

(21) Appl. No.: 17/757,097

(22) PCT Filed: Dec. 15, 2020

(86) PCT No.: PCT/JP2020/046792
§ 371 (c)(1),
(2) Date: Jun. 9, 2022

(87) PCT Pub. No.: WO2021/131914
PCT Pub. Date: Jul. 1, 2021

(65) Prior Publication Data
US 2023/0006262 A1 Jan. 5, 2023

(30) Foreign Application Priority Data
Dec. 27, 2019 (JP) ................................. 2019-239663

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 10/0585* (2013.01); *H01M 50/121* (2021.01); *H01M 50/403* (2021.01)

(58) Field of Classification Search
CPC .. H01M 4/02; H01M 10/0587; H01M 50/121; H01M 10/0525
(Continued)

(56) References Cited

U.S. PATENT DOCUMENTS

| | | | |
|---|---|---|---|
| 2009/0191461 A1 | 7/2009 | Nakamura | |
| 2009/0263699 A1* | 10/2009 | Sadasue | H01M 8/1053 |
| | | | 429/483 |
| 2010/0003598 A1* | 1/2010 | Nakamura | H01M 4/02 |
| | | | 429/209 |
| 2014/0248525 A1 | 9/2014 | Iwai et al. | |

(Continued)

FOREIGN PATENT DOCUMENTS

| | | | |
|---|---|---|---|
| CN | 104145364 A | 11/2014 | |
| CN | 108352487 A * | 7/2018 | H01G 11/52 |

(Continued)

OTHER PUBLICATIONS

Kim, Translation of "Electrode-separator assembly, secondary battery comprising the same, and manufacturing method therof", Apr. 20, 2016 (Year: 2016).*

(Continued)

*Primary Examiner* — Niki Bakhtiari
*Assistant Examiner* — Ryan K. Blackwell-Rudasill
(74) *Attorney, Agent, or Firm* — KENJA IP LAW PC

(57) ABSTRACT

A secondary battery includes a laminate in which a positive electrode, a separator, and a negative electrode are stacked in stated order. Resistance A per unit area of a central region P that has a similar shape to a shape of a surface Z that is either or both of an affixing surface X of the positive electrode and the separator and an affixing surface Y of the negative electrode and the separator, that has a center at the same position as a center of the surface Z, and that has an area equivalent to 10% of area of the surface Z is larger than resistance B per unit area of a region Q other than the central region P at the surface Z.

8 Claims, 11 Drawing Sheets

(51) Int. Cl.
H01M 10/0585 (2010.01)
H01M 50/121 (2021.01)
H01M 50/403 (2021.01)

(58) Field of Classification Search
USPC .......................................................... 429/163
See application file for complete search history.

(56) References Cited

U.S. PATENT DOCUMENTS

| | | | | |
|---|---|---|---|---|
| 2015/0017542 A1* | 1/2015 | Hirai | ................... | H01M 4/5825 |
| | | | | 429/231.95 |
| 2016/0205775 A1* | 7/2016 | Uchida | ................ | H05K 3/1283 |
| | | | | 174/257 |
| 2018/0342711 A1 | 11/2018 | Asai | | |
| 2020/0259148 A1* | 8/2020 | Miyazawa | .......... | H01M 50/449 |
| 2020/0335827 A1 | 10/2020 | Sugimoto et al. | | |
| 2023/0139997 A1* | 5/2023 | Masson | ............... | H01M 50/249 |
| | | | | 29/623.1 |

FOREIGN PATENT DOCUMENTS

| | | | | | |
|---|---|---|---|---|---|
| EP | 3163653 | A1 | 5/2017 | | |
| FR | 3080955 | A1 * | 11/2019 | .......... | H01M 50/213 |
| JP | H04308654 | A | 10/1992 | | |
| JP | H1173947 | A * | 3/1999 | | |
| JP | 2002184468 | A | 6/2002 | | |
| JP | 2017027945 | A | 2/2017 | | |
| JP | 2017050064 | A | 3/2017 | | |
| JP | 2018113122 | A | 7/2018 | | |
| KR | 20160042666 | A * | 4/2016 | .......... | H01M 50/491 |
| KR | 1020180083333 | A | 7/2018 | | |
| WO | 2019131348 | A1 | 7/2019 | | |

OTHER PUBLICATIONS

Masson, Translation of Method for assembling a battery), Nov. 8, 2013.*

Translation of JP-H1173947-A (Year: 1999).*

Jun. 28, 2022, International Preliminary Report on Patentability issued in the International Patent Application No. PCT/JP2020/046792.

Mar. 9, 2021, International Search Report issued in the International Patent Application No. PCT/JP2020/046792.

Jul. 18, 2024, the Extended European Search Report issued by the European Patent Office in the corresponding European Patent Application No. 20907309.7.

* cited by examiner

300

310    320

310S

SECONDARY BATTERY AND METHOD OF PRODUCING SAME

TECHNICAL FIELD

The present disclosure relates to a secondary battery and a method of producing the same.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as a positive electrode, a negative electrode, and a separator that isolates the positive electrode and the negative electrode from each other and prevents short circuiting between the positive and negative electrodes.

Known secondary battery structures include a stacked structure in which a positive electrode, a separator, and a negative electrode are stacked alternately and a wound structure in which an elongated positive electrode, separator, and negative electrode are overlapped and then wound up concentrically. In particular, stacked secondary batteries have been attracting interest in recent years from a viewpoint of having excellent energy density, safety, quality, and durability.

In production of a secondary battery, a battery member having adhesive material at a surface thereof may be produced, and this battery member may then be affixed to another battery member, for example. Moreover, a battery member having adhesive material at a surface thereof can be produced by applying, onto the battery member surface, a composition for adhesion (slurry for a secondary battery) containing a polymer (binder) displaying adhesiveness and so forth that are dispersed and/or dissolved in a solvent, and then drying the composition for adhesion (for example, refer to Patent Literature (PTL) 1).

CITATION LIST

Patent Literature

PTL 1: JP2017-27945A

SUMMARY

Technical Problem

In the case of a large secondary battery that is for in-vehicle use, for example, the battery generates heat during charging and discharging, leading to the presence of sites of localized high temperature inside of the battery. On the other hand, lithium ion batteries are known to readily degrade and have shortened life at high temperature. Accordingly, since temperature non-uniformity inside a battery results in the formation of sites of localized degradation and also in deterioration of the life of the battery as a whole, there is demand for eliminating temperature non-uniformity inside batteries. (Note that the life of a battery is also referred to using the term "cycle characteristics" in the following description.)

However, there is room for improvement of the cycle characteristics of a conventional secondary battery such as described above because temperature non-uniformity arises inside the battery.

Accordingly, an object of the present disclosure is to provide a secondary battery in which internal temperature non-uniformity is eliminated and that has excellent cycle characteristics.

Solution to Problem

The inventors conducted diligent investigation to achieve the object set forth above. The inventors discovered that it is possible to improve cycle characteristics of a secondary battery by setting the resistance A per unit area of a central region P that has a similar shape to a shape of a surface Z that is either or both of an affixing surface X of a positive electrode and a separator and an affixing surface Y of a negative electrode and a separator, that has a center at the same position as a center of the surface Z, and that has a specific area as larger than resistance B per unit area of a region Q other than the central region P at the surface Z. In this manner, the inventors completed the present disclosure.

Specifically, the present disclosure aims to advantageously solve the problem set forth above, and a presently disclosed secondary battery comprises a laminate in which a positive electrode, a separator, and a negative electrode are stacked in stated order, wherein resistance A per unit area of a central region P that has a similar shape to a shape of a surface Z that is either or both of an affixing surface X of the positive electrode and the separator and an affixing surface Y of the negative electrode and the separator, that has a center at the same position as a center of the surface Z, and that has an area equivalent to 10% of area of the surface Z is larger than resistance B per unit area of a region Q other than the central region P at the surface Z. By setting the resistance A per unit area of the central region P that has a similar shape to the shape of the surface Z, that has a center at the same position as the center of the surface Z, and that has the specific area set forth above as larger than the resistance B per unit area of the region Q other than the central region P at the surface Z in this manner, it is possible to improve cycle characteristics of the secondary battery.

Note that the "center" of a "surface" or "region" referred to in the present disclosure is the "center of mass" of the "surface" or "region". The "center" of a "surface" or "region" ("center of mass" of a "surface" or "region") is, for example, the "intersection of diagonals" in a case in which the shape of the surface or region is a square, a rectangle, a parallelogram, or a rhombus, the "intersection of medians" in a case in which the shape of the surface or region is a triangle, and the "center of a circle" in a case in which the shape of the surface or region is a circle.

Also note that the resistance A per unit area of the central region P and the resistance B per unit area of the region Q other than the central region P at the surface Z can be measured by a method described in the EXAMPLES section of the present specification.

In the presently disclosed secondary battery, it is preferable that an adhesive material is present at the surface Z and that a ratio of coverage E of the adhesive material in the central region P of the surface Z is larger than a ratio of coverage F of the adhesive material in the region Q other than the central region P of the surface Z. When the ratio of coverage E of the adhesive material in the central region P of the surface Z is larger than the ratio of coverage F of the adhesive material in the region Q other than the central region P of the surface Z, cycle characteristics of the secondary battery can be further improved.

In the presently disclosed secondary battery, the ratio of coverage E is preferably not less than 1.1% and not more than 30%. When the ratio of coverage E of the adhesive material in the central region P of the surface Z is within the specific range set forth above, high output characteristics of the secondary battery can be maintained while also further improving cycle characteristics of the secondary battery. Moreover, when the ratio of coverage E of the adhesive material in the central region P of the surface Z is within the specific range set forth above, adhesive strength of an electrode and a separator can be sufficiently ensured while also causing the secondary battery to sufficiently display excellent output characteristics.

In the presently disclosed secondary battery, the ratio of coverage F is preferably not less than 0.3% and less than 0.4×E %. When the ratio of coverage F of the adhesive material in the region Q other than the central region P of the surface Z is within the specific range set forth above, adhesive strength of an electrode and a separator can be sufficiently ensured while also causing the secondary battery to sufficiently display excellent output characteristics. Moreover, when the ratio of coverage F of the adhesive material in the region Q other than the central region P of the surface Z is within the specific range set forth above, cycle characteristics of the secondary battery can be further improved.

In the presently disclosed secondary battery, it is preferable that an adhesive material is present at the surface Z and that a ratio of coverage of the adhesive material at the surface Z decreases gradually from the center of the surface Z toward a periphery of the surface Z. When the ratio of coverage of the adhesive material at the surface Z decreases gradually from the center of the surface Z toward the periphery of the surface Z, cycle characteristics of the secondary battery can be further improved.

In the presently disclosed secondary battery, it is preferable that an adhesive material is present at the surface Z, that the adhesive material contains a particulate polymer, and that the particulate polymer has a core-shell structure including a core portion and a shell portion partially covering an outer surface of the core portion. When a particulate polymer having a core-shell structure that includes a core portion and a shell portion partially covering an outer surface of the core portion is used as the adhesive material, adhesive strength of an electrode and a separator can be sufficiently ensured while also causing the secondary battery to display excellent output characteristics.

Moreover, the present disclosure aims to advantageously solve the problem set forth above, and a presently disclosed method of producing a secondary battery is a method of producing a secondary battery including a laminate in which a positive electrode, a separator, and a negative electrode are stacked in stated order, comprising a step of applying an adhesive material at a surface Z that is either or both of an affixing surface X of the positive electrode and the separator and an affixing surface Y of the negative electrode and the separator, wherein a ratio of coverage E of the adhesive material in a central region P that has a similar shape to a shape of the surface Z, that has a center at the same position as a center of the surface Z, and that has an area equivalent to 10% of area of the surface Z is larger than a ratio of coverage F of the adhesive material in a region Q other than the central region P of the surface Z. Through the presently disclosed method of producing a secondary battery set forth above, it is possible to obtain a secondary battery having excellent cycle characteristics.

In the presently disclosed method of producing a secondary battery, the ratio of coverage E is preferably not less than 1.1% and not more than 30%. When the ratio of coverage E of the adhesive material in the central region P of the surface Z is within the specific range set forth above, cycle characteristics of the produced secondary battery can be further improved. Moreover, when the ratio of coverage E of the adhesive material in the central region P of the surface Z is within the specific range set forth above, adhesive strength of an electrode and a separator can be sufficiently ensured while also causing the produced secondary battery to sufficiently display excellent output characteristics.

In the presently disclosed method of producing a secondary battery, the ratio of coverage F is preferably not less than 0.3% and less than 0.4×E %. When the ratio of coverage F of the adhesive material in the region Q other than the central region P of the surface Z is within the specific range set forth above, adhesive strength of an electrode and a separator can be sufficiently ensured while also causing the produced secondary battery to sufficiently display excellent output characteristics. Moreover, when the ratio of coverage F of the adhesive material in the region Q other than the central region P of the surface Z is within the specific range set forth above, cycle characteristics of the produced secondary battery can be further improved.

In the presently disclosed method of producing a secondary battery, it is preferable that a ratio of coverage of the adhesive material at the surface Z decreases gradually from the center of the surface Z toward a periphery of the surface Z. When the ratio of coverage of the adhesive material at the surface Z decreases gradually from the center of the surface Z toward the periphery of the surface Z, cycle characteristics of the produced secondary battery can be further improved.

In the presently disclosed method of producing a secondary battery, the adhesive material contains a particulate polymer, and the particulate polymer has a core-shell structure including a core portion and a shell portion partially covering an outer surface of the core portion. When a particulate polymer having a core-shell structure that includes a core portion and a shell portion partially covering an outer surface of the core portion is used as the adhesive material, adhesive strength of an electrode and a separator can be sufficiently ensured while also causing the produced secondary battery to display excellent output characteristics.

Advantageous Effect

According to the present disclosure, it is possible to provide a secondary battery having excellent cycle characteristics.

DETAILED DESCRIPTION

Figure 1A:
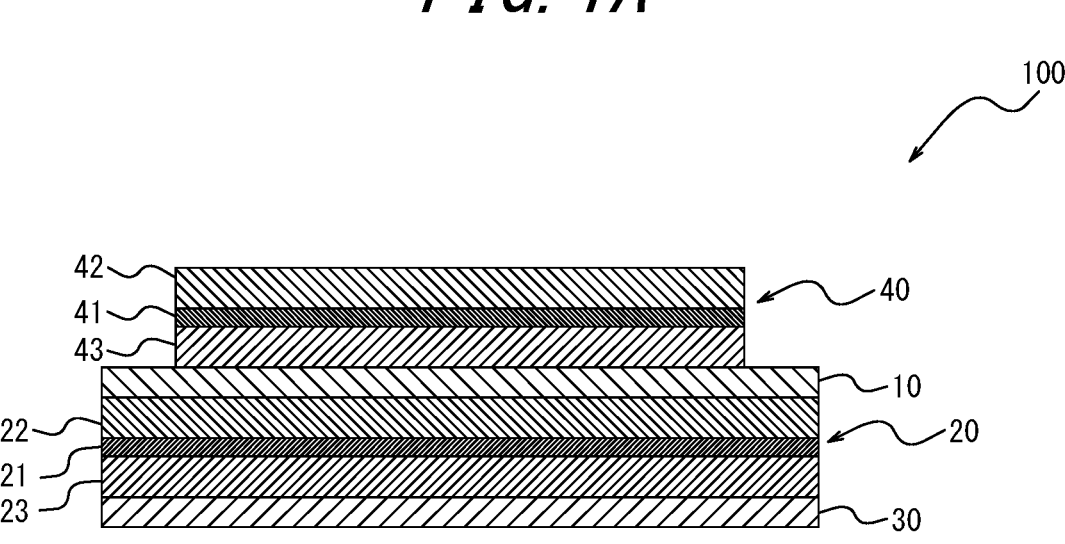
FIG. 1A is a front view illustrating the structure of one example of a laminate in a presently disclosed secondary battery.

The following describes the presently disclosed secondary battery and method of producing a secondary battery with reference to the drawings. Note that the dimensions of some members in the drawings are enlarged or reduced in order to facilitate understanding.

(Secondary Battery)

The presently disclosed secondary battery includes at least a specific laminate and may include an electrolyte solution and other members as necessary. Moreover, the presently disclosed secondary battery can be produced using the presently disclosed method of producing a secondary battery, for example.

<Laminate>

The laminate in the presently disclosed secondary battery is a laminate in which a positive electrode, a separator, and a negative electrode are stacked in stated order.

Figure 1B:
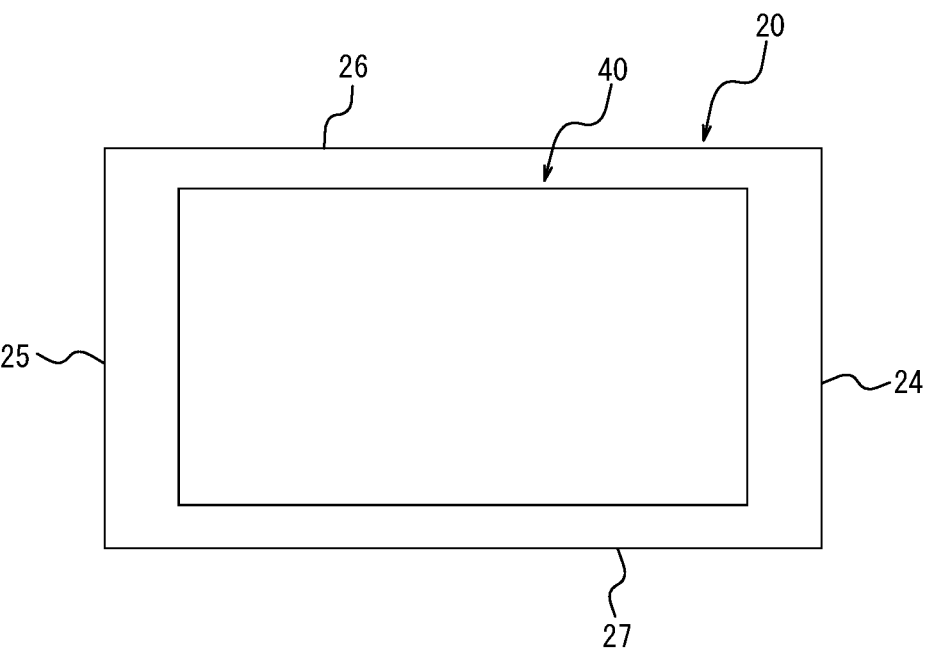
FIG. 1B is a plan view for describing a positional relationship of a negative electrode and a positive electrode in the laminate illustrated in FIG. 1A.
Figure 2:
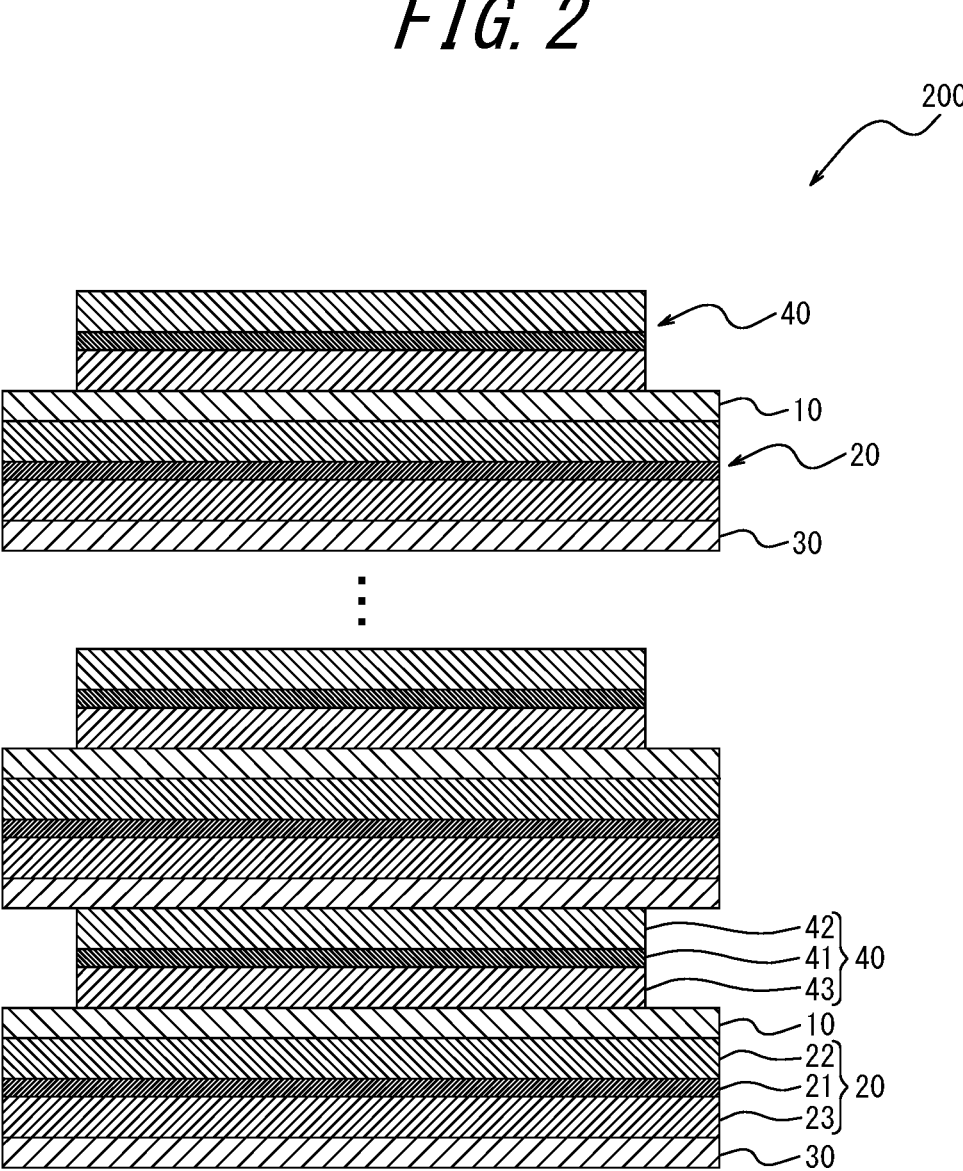
FIG. 2 is a front view illustrating the structure of one example of a stack obtained through stacking of laminates in a presently disclosed secondary battery.
Figure 3:
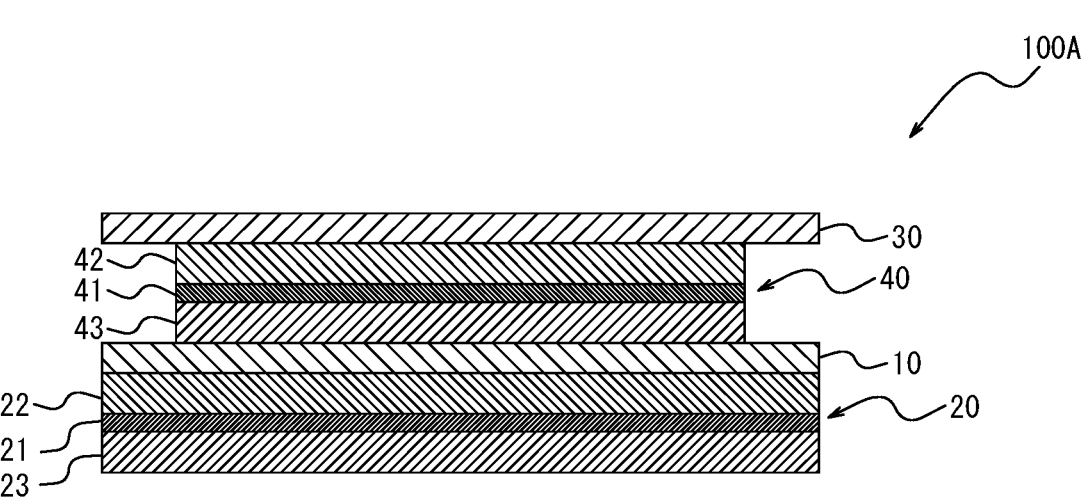
FIG. 3 is a front view illustrating the structure of another example of a laminate in a presently disclosed secondary battery.

Note that the laminate in the presently disclosed secondary battery may have a structure such as illustrated in FIGS. 1A and 1B or a structure such as illustrated in FIG. 3, for example. Moreover, the laminate may be stacked to obtain a stack 200 as illustrated in FIG. 2, for example, and can then be used in a stacked secondary battery or the like.

As illustrated in FIGS. 1A and 1B or FIG. 3, the laminate 100 or 100A includes a negative electrode 20, a first separator 10 affixed to one surface of the negative electrode, a positive electrode 40 affixed to a surface of the first separator 10 at the opposite side thereof to the negative electrode 20, and a second separator 30 affixed to the other surface of the negative electrode 20 or a surface of the positive electrode 40 at the opposite side thereof to the first separator 10.

Moreover, in the laminate 100 or 100A, the positive electrode 40 has a smaller size in plan view than the negative electrode 20, the first separator 10, and the second separator 30 as illustrated in FIG. 1B. More specifically, in plan view, the negative electrode 20 of the laminate 100 or 100A includes a first edge 24 and a second edge 25 that are in opposition in an orthogonal direction relative to a stacking direction, and the positive electrode 40 is located between the first edge 24 and the second edge 25 when viewed in the stacking direction. Note that the first edge 24 and the second edge 25 are normally edges that correspond to cutting positions where an elongated negative electrode web has been cut to obtain the negative electrode 20.

The laminate 100 illustrated in the front view of FIG. 1A includes a negative electrode 20, a first separator 10 affixed to one surface (upper surface in FIG. 1A) of the negative electrode 20, a positive electrode 40 affixed to a surface of the first separator 10 at the opposite side thereof (upper side in FIG. 1A) to the negative electrode 20, and a second separator 30 affixed to the other surface of the negative electrode 20. In this example, the first separator 10, the negative electrode 20, the second separator 30, and the positive electrode 40 each have a rectangular shape in plan view. The negative electrode 20 has a structure in which negative electrode mixed material layers 22 and 23 containing a negative electrode active material have been formed at both surfaces of a negative electrode current collector 21. The positive electrode 40 has a structure in which positive electrode mixed material layers 42 and 43 containing a positive electrode active material have been formed at both surfaces of a positive electrode current collector 41. The positive electrode 40 has a smaller size in plan view than the negative electrode 20, the first separator 10, and the second separator 30 and, as illustrated by the plan view positional relationship of the negative electrode 20 and the positive electrode 40 in FIG. 1B, the positive electrode 40 is located between a first edge 24 and a second edge 25 of the negative electrode 20 that are in opposition in an orthogonal direction (left/right direction in FIG. 1B) relative to the stacking direction and also between a third edge 26 and a fourth edge 27 of the negative electrode 20 that extend in the left/right direction in FIG. 1B and are orthogonal to the first edge 24 and the second edge 25.

The laminate 100A illustrated in the front view of FIG. 3 has the same configuration as the laminate 100 illustrated in FIGS. 1A and 1B with the exception that the second separator 30 is affixed to a surface of the positive electrode 40 at the opposite side thereof (upper side in FIG. 3) to the first separator 10 instead of being affixed to the other surface of the negative electrode 20.

It should be noted, however, that the laminate in the presently disclosed secondary battery is not limited to the examples illustrated in FIGS. 1A and 1B and FIG. 3. For example, the first separator 10 and the second separator 30 may have a larger size in plan view than the negative electrode 20 in the laminate. By using a laminate in which the first separator 10 and the second separator 30 are larger than the negative electrode 20, safety of the secondary battery can be further increased.

<<Surface Z, Central Region P, and Other Region Q>>

The following describes a central region P and a region Q other than the central region P (hereinafter, also referred to as the "other region Q") at a surface Z using FIG. 4.

The surface Z is either or both of an affixing surface Y of the negative electrode 20 and the first separator 10 and an affixing surface X of the positive electrode 40 and the first separator 10.

Figure 4:
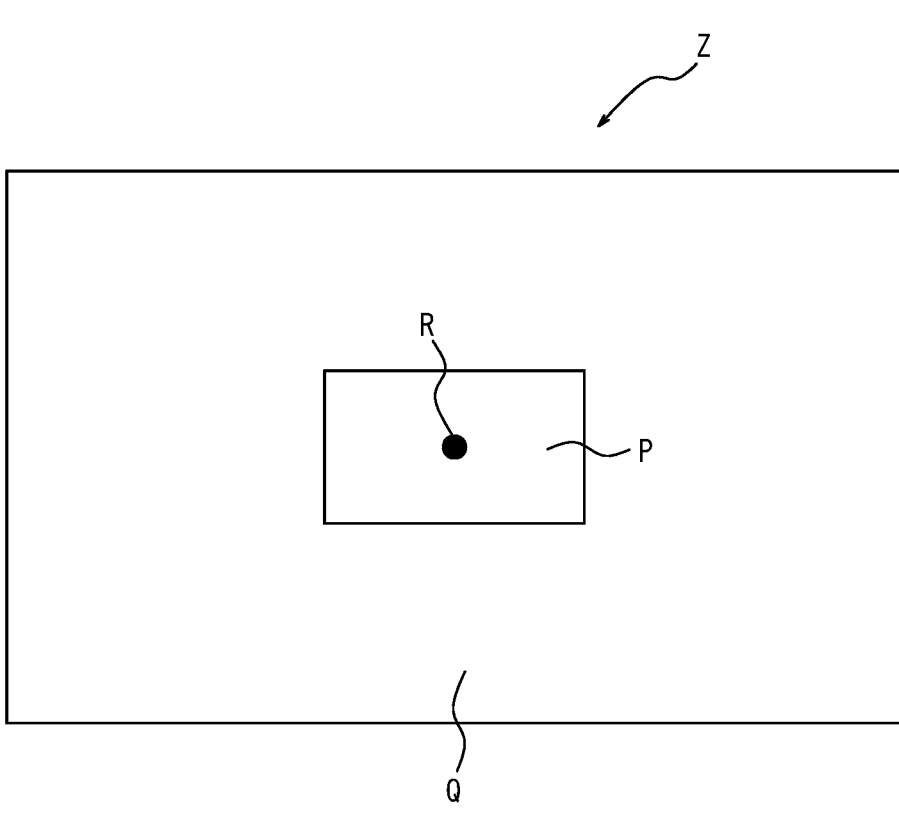
FIG. 4 is an explanatory diagram for describing a central region P and another region Q at a surface Z.

As illustrated in FIG. 4, the central region P is a region that has a center (center of mass) at the same position as a center (center of mass) R (intersection of diagonals of rectangle) of the surface Z, that has a similar shape to a shape (rectangle) of the surface Z, and that has an area equivalent to 10% of the area of the surface Z. The other region Q is all regions other than the central region P at the surface Z and is a region that has an area equivalent to 90% of the area of the surface Z.

A feature of the presently disclosed secondary battery is that the resistance A per unit area of the central region P is larger than the resistance B per unit area of the other region Q. Through the resistance A per unit area of the central region P being larger than the resistance B per unit area of the other region Q in this manner, it is possible to cause the secondary battery to display excellent cycle characteristics.

Although it is not clear why the secondary battery can be caused to display excellent cycle characteristics through the resistance A per unit area of the central region P being larger than the resistance B per unit area of the other region Q, the reason for this is presumed to be as follows.

Firstly, heat is generated at the surface Z through the flow of current during charging and discharging of the secondary battery. In the case of a conventional secondary battery in which a value of the resistance A per unit area of the central region P is not larger than a value of the resistance B per unit area of the other region Q, heat is generated to at least the same extent in the central region P as in the other region Q. Moreover, at the surface Z, heat can easily be released from the other region Q that is close to an end section of the surface Z but cannot easily be released from the central region P that is distant from the end section of the surface Z. For this reason, accumulation of heat in the central region P is thought to cause the temperature in the central region P to rise compared to that in the other region Q in the case of the conventional secondary battery described above, thereby resulting in the occurrence of temperature non-uniformity inside the battery and the deterioration of cycle characteristics of the secondary battery.

In contrast, as a result of the resistance A per unit area of the central region P being larger than the resistance B per unit area of the other region Q in the presently disclosed secondary battery, it is possible to reduce the current density in the central region P during charging and discharging. This makes it possible to reduce the amount of heat that is generated in the central region P. Therefore, it is presumed that since increased temperature of the central region P due to accumulation of heat can be inhibited, non-uniformity of temperature between the central region P and the other region Q can be reduced, and thus the secondary battery can be caused to display excellent cycle characteristics.

Note that the "end section of the surface Z" refers to a region that, in a situation in which a region that has a center at the same position as the center R of the surface Z, that has a similar shape to the surface Z, and that has an area equivalent to 90% of the area of the surface Z is taken to be a central region P″, is a region of the surface Z other than the central region P″.

A ratio (A/B) of the resistance A per unit area of the central region P and the resistance B per unit area of the other region Q is required to be more than 1, is preferably more than 1.005, and more preferably more than 1.01, and is preferably less than 2, and more preferably less than 1.5. Through the ratio (A/B) of the resistance A per unit area of the central region P and the resistance B per unit area of the other region Q being more than 1, cycle characteristics of the secondary battery can be sufficiently enhanced. On the other hand, when the ratio (A/B) of the resistance A per unit area of the central region P and the resistance B per unit area of the other region Q is less than 2, output characteristics of the secondary battery can be improved.

Note that the resistance A per unit area of the central region P and the resistance B per unit area of the other region Q can be adjusted through the ratio of coverage of adhesive material in each of these regions, the type of polymer used as the adhesive material, and so forth.

[Adhesive Material]

An adhesive material is normally present at the surface Z (affixing surface X and/or Y). The adhesive material is a material that adheres an electrode (positive electrode or negative electrode) and a separator at the affixing surface X and/or Y. Note that the adhesive material is described in detail further below.

—Application Method of Adhesive Material—

The adhesive material can be supplied to the affixing surface X and/or Y in any state, such as a solid state, a molten state, a dissolved state in a solvent, or a dispersed state in a solvent. In particular, it is preferable that the adhesive material is supplied in a dissolved state in a solvent or a dispersed state in a solvent, and more preferable that the adhesive material is supplied in a dispersed state in a solvent.

In a case in which the adhesive material is supplied to the affixing surface X and/or Y in a dissolved state in a solvent or a dispersed state in a solvent (i.e., in a case in which a composition for adhesion containing the adhesive material and a solvent is supplied to the affixing surface), the solvent of the composition for adhesion can be water, an organic solvent, or a mixture thereof, for example, without any specific limitations. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, propylene glycol, and ethylene glycol monomethyl ether.

Of the examples given above, a solvent that includes either or both of water and an alcohol is preferable as the solvent from a viewpoint of efficiently producing the laminate.

Note that the solvent described above may be at least partially removed by drying or the like in a production step of the laminate.

Application of the adhesive material using a coating machine (51-54 in FIGS. 9 and 10) described further below can be performed by a known application method such as an inkjet, spraying, dispensing, gravure coating, or screen printing method. Of these application methods, it is preferable that the adhesive material is applied using an inkjet method from a viewpoint of enabling simple adjustment of the amount and range of application of the adhesive material.

The adhesive material is applied to only part of the affixing surface X and/or Y. Specifically, the adhesive material is disposed (applied) such as to be arranged in a specific pattern such as a striped pattern, a dotted pattern, or a lattice pattern, for example, at the affixing surface X and/or Y. From a viewpoint of enhancing output characteristics of the secondary battery, it is preferable that the adhesive material is disposed (applied) such as to be arranged in a dotted pattern at the affixing surface X and/or Y.

The diameter of dots of adhesive material arranged in the dotted pattern is preferably 10 μm or more, and more preferably 20 μm or more, and is preferably 100 μm or less, and more preferably 80 μm or less. When the diameter of dots of adhesive material is not less than any of the lower limits set forth above, adhesive strength of an electrode and a separator can be increased. On the other hand, when the diameter of dots of adhesive material is not more than any of the upper limits set forth above, deterioration of output characteristics of the secondary battery can be inhibited.

The following describes a case in which adhesive material is applied at the surface Z such that two regions are present: "region S where adhesive material is applied densely" and "region T where adhesive material is applied sparsely".

The ratio of coverage of adhesive material in the "region S where adhesive material is applied densely" is set as larger than the ratio of coverage of adhesive material in the "region T where adhesive material is applied sparsely".

Note that in the present specification, the "ratio of coverage of adhesive material" at a given surface or region refers to the proportion constituted by the area of a section that is covered by the adhesive material among the area of the entirety of the given surface or region (i.e., (area of section covered by adhesive material/area of entire surface or region)×100(%)).

Also note that in the present specification, in a case in which a composition for adhesion containing an adhesive material and a solvent is supplied to an affixing surface, "adhesive material" in "ratio of coverage of adhesive material" refers to material in a state in which the solvent has been removed from the composition for an adhesive layer by drying or the like.

The shape of the "region S where adhesive material is applied densely" is not specifically limited and can be set as appropriate to the extent that the desired effects are obtained. In other words, the "region S where adhesive material is applied densely" can have any shape so long as the resistance A per unit area of the central region P described above is larger than the resistance B per unit area of the other region Q.

Note that the "region T where adhesive material is applied sparsely" is all regions of the surface Z other than the "region S where adhesive material is applied densely".

From a viewpoint of further enhancing cycle characteristics of the secondary battery, the shape of the "region S where adhesive material is applied densely" is preferably set such that the ratio of coverage E of adhesive material in the central region P described above is larger than the ratio of coverage F of adhesive material in the other region Q.

For example, it is preferable that the "region S where adhesive material is applied densely" includes the center of the surface Z and more preferable that the "region S where adhesive material is applied densely" has a center at the same position as the center of the surface Z from a viewpoint of further enhancing cycle characteristics of the secondary battery.

Although the shape of the "region S where adhesive material is applied densely" may be similar to the shape of the surface Z or may not be similar to the shape of the surface Z, a shape that is similar to the shape of the surface Z is preferable from a viewpoint of further enhancing cycle characteristics of the secondary battery.

The proportion constituted by the area of the "region S where adhesive material is applied densely" among the area of the entire surface Z is preferably 5% or more, and more preferably 10% or more, and is preferably 60% or less, more preferably 40% or less, and even more preferably 30% or less. When the proportion constituted by the area of the "region S where adhesive material is applied densely" among the area of the entire surface Z is within any of the specific ranges set forth above, cycle characteristics of the secondary battery can be further enhanced. Moreover, when the proportion constituted by the area of the "region S where adhesive material is applied densely" among the area of the entire surface Z is not more than any of the upper limits set forth above, sufficiently high output characteristics of the secondary battery can be ensured.

The proportion constituted by the area of the "region T where adhesive material is applied sparsely" among the area of the entire surface Z is preferably 40% or more, more preferably 60% or more, and even more preferably 70% or more, and is preferably 95% or less, and more preferably 90% or less. When the proportion constituted by the area of the "region T where adhesive material is applied sparsely" among the area of the entire surface Z is within any of the specific ranges set forth above, cycle characteristics of the secondary battery can be further enhanced. Moreover, when the proportion constituted by the area of the "region T where adhesive material is applied sparsely" among the area of the entire surface Z is not less than any of the lower limits set forth above, sufficiently high output characteristics of the secondary battery can be ensured.

A ratio of coverage J of adhesive material in the "region S where adhesive material is applied densely" is not specifically limited so long as it is larger than a ratio of coverage K of adhesive material in the "region T where adhesive material is applied sparsely", but is preferably 1.1% or more, and more preferably 3% or more, and is preferably 30% or less, more preferably 10% or less, and even more preferably 8% or less. When the ratio of coverage J of adhesive material in the "region S where adhesive material is applied densely" is not less than any of the lower limits set forth above, cycle characteristics of the secondary battery can be further enhanced. Moreover, when the ratio of coverage J of adhesive material in the "region S where adhesive material is applied densely" is not more than any of the upper limits set forth above, sufficiently high output characteristics of the secondary battery can be ensured.

The ratio of coverage K of adhesive material in the "region T where adhesive material is applied sparsely" is not specifically limited so long as it is smaller than the ratio of coverage J of adhesive material in the "region S where adhesive material is applied densely", but is preferably 0.3% or more, and more preferably 0.5% or more, and is preferably less than 0.4×J %. When the ratio of coverage of adhesive material in the "region T where adhesive material is applied sparsely" is not less than any of the lower limits set forth above, adhesive strength of an electrode and a separator can be sufficiently ensured. Moreover, when the ratio of coverage K of adhesive material in the "region T where adhesive material is applied sparsely" is less than the upper limit set forth above, cycle characteristics of the secondary battery can be sufficiently enhanced.

Note that the ratio of coverage of adhesive material in each of the "region S where adhesive material is applied densely" and the "region T where adhesive material is applied sparsely" can be adjusted by altering the arrangement pattern of adhesive material that is disposed (applied) in that region.

Specifically, in a case in which adhesive material is disposed (applied) such as to be arranged in a dotted pattern in a given region, the ratio of coverage of adhesive material in that region can be adjusted by altering the radius and the distance between centers of dots of adhesive material.

Figure 5:
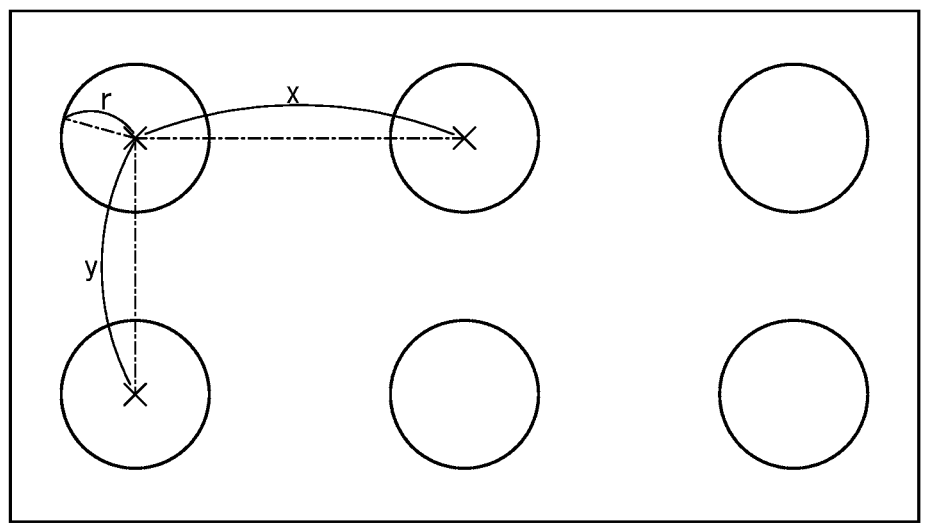
FIG. 5 is an explanatory diagram illustrating one example of an application pattern of adhesive material.

In the case of a region where adhesive material is disposed (applied) in a dotted pattern such that dots are formed at fixed intervals in two orthogonally intersecting directions as illustrated in FIG. 5, for example, the ratio of coverage of adhesive material can be determined by the following formula (1) using distances (pitches) x and y between centers of the dots and the radius r of the dots.

$$\text{Ratio of coverage of adhesive material}=\{\pi r^2/(x\cdot y)\}\times 100(\%) \tag{1}$$

Moreover, in a case in which adhesive material is disposed (applied) such as to be arranged in a striped pattern in a given region, the ratio of coverage of adhesive material in that region can be adjusted by altering the line width of application sections for adhesive material and the spacing of these application sections (line width of non-application sections).

Figure 6:
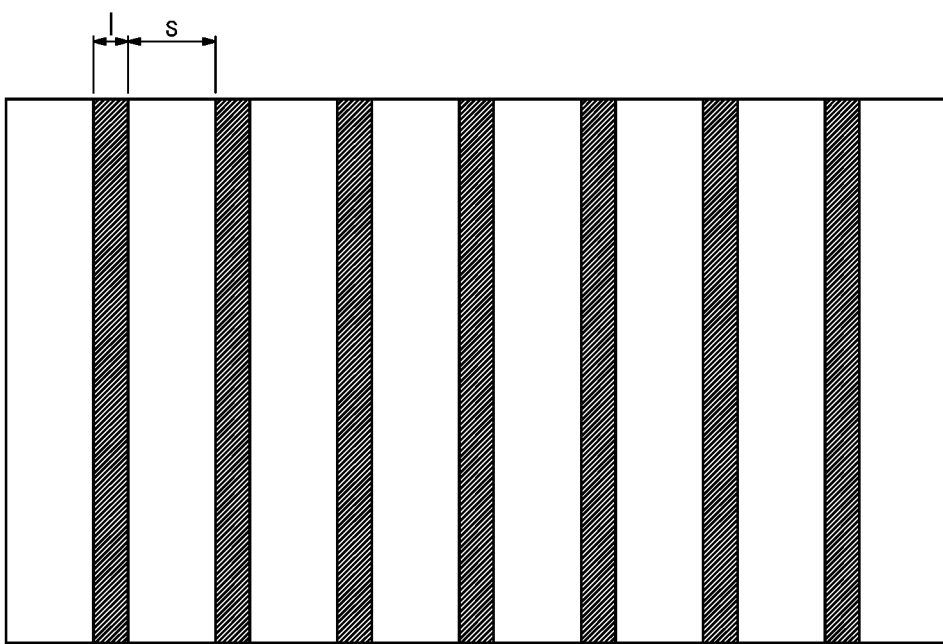
FIG. 6 is an explanatory diagram illustrating another example of an application pattern of adhesive material.

In the case of a region where adhesive material is applied in a striped pattern in which the line width of application sections for adhesive material is 1 and the spacing of the application sections (line width of non-application sections) is s as illustrated in FIG. 6, for example, the ratio of coverage of adhesive material can be determined by the following formula (2).

$$\text{Ratio of coverage of adhesive material} = \{1/(1+s)\} \times 100 (\%) \quad (2)$$

The coating weight of adhesive material in the region S where adhesive material is applied densely is preferably 0.02 $g/m^2$ or more, and is preferably 0.8 $g/m^2$ or less, and more preferably 0.35 $g/m^2$ or less. When the coating weight of adhesive material in the region S where adhesive material is applied densely is not less than the lower limit set forth above, adhesive strength of an electrode and a separator can be sufficiently ensured. Moreover, when the coating weight of adhesive material in the region S where adhesive material is applied densely is not more than any of the upper limits set forth above, sufficiently high output characteristics of the secondary battery can be ensured.

The coating weight of adhesive material in the region T where adhesive material is applied sparsely is preferably 0.02 $g/m^2$ or more, and more preferably 0.03 $g/m^2$ or more, and is preferably 0.35 $g/m^2$ or less. When the coating weight of adhesive material in the region T where adhesive material is applied sparsely is not less than any of the lower limits set forth above, adhesive strength of an electrode and a separator can be sufficiently ensured. Moreover, when the coating weight of adhesive material in the region T where adhesive material is applied sparsely is not more than the upper limit set forth above, sufficiently high output characteristics of the secondary battery can be ensured.

Note that in the present specification, in a case in which a composition for adhesion containing an adhesive material and a solvent is supplied to an affixing surface, "adhesive material" in "coating weight of adhesive material" refers to material in a state in which the solvent has been removed from the composition for an adhesive layer by drying or the like.

It should be noted that adhesive material may be disposed (applied) in the same pattern throughout each region among the "region S where adhesive material is applied densely" and the "region T where adhesive material is applied sparsely" described above, or adhesive material disposed (applied) in a plurality of different patterns may be present in each of these regions.

Moreover, in each of these regions, the pattern in which adhesive material is applied may change gradually in a given fixed direction. For example, in a case in which adhesive material is applied in a dotted pattern, the radius and distance between centers of dots of the adhesive material may change gradually along a given fixed direction, whereas in a case in which adhesive material is applied in a striped pattern, the line width of application sections for the adhesive material and the spacing of these application sections (line width of non-application sections) may change gradually along a given fixed direction.

The direction of gradual change of the pattern in which adhesive material is applied is not specifically limited so long as the desired effects are obtained.

For example, it is preferable that in either or both of the "region S where adhesive material is applied densely" and the "region T where adhesive material is applied sparsely", the pattern in which adhesive material is applied changes gradually along a direction from the center of the surface Z toward the periphery of the surface Z such that, when the surface Z is viewed as a whole, the ratio of coverage of adhesive material at the surface Z decreases gradually from the center of the surface Z toward the periphery of the surface Z. When the ratio of coverage of adhesive material decreases gradually from the center of the surface Z toward the periphery of the surface Z, cycle characteristics of the secondary battery can be further enhanced.

A case in which the ratio of coverage of adhesive material at the surface Z decreases gradually from the center of the surface Z toward the periphery of the surface Z is described with reference to the drawings.

Figure 7:
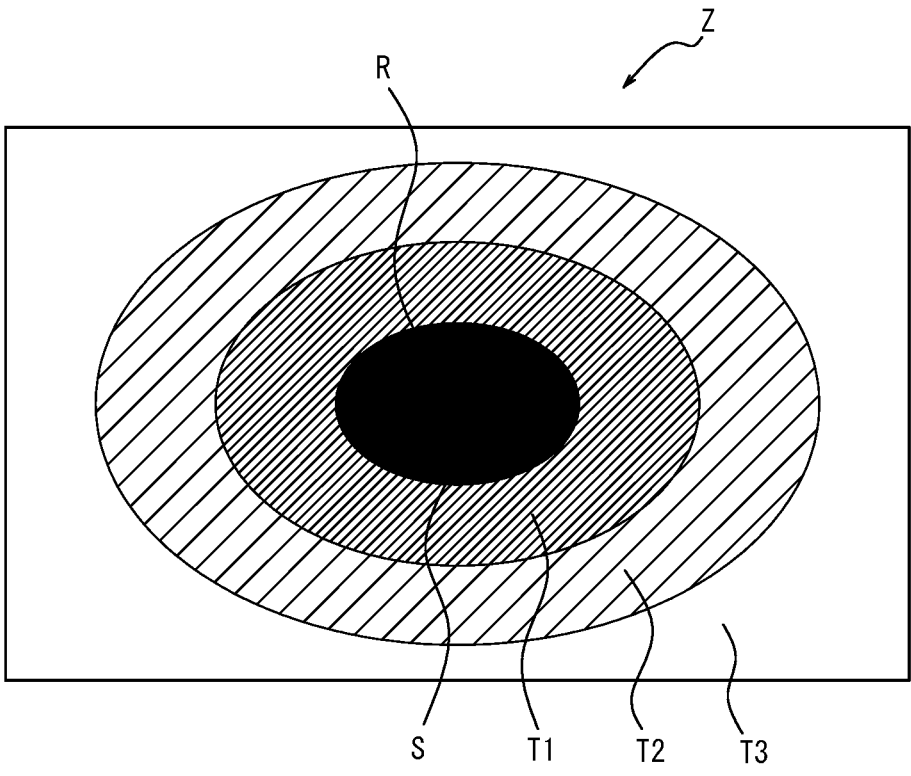
FIG. 7 is an explanatory diagram illustrating one example of a method of applying adhesive material to a surface Z.

At a surface Z illustrated in FIG. 7, a region S where adhesive material is applied densely (ratio of coverage of adhesive material: G) is present. In addition, a region T1 where adhesive material is applied sparsely (ratio of coverage of adhesive material: H1), a region T2 where adhesive material is applied more sparsely (ratio of coverage of adhesive material: H2), and a region T3 where adhesive material is applied even more sparsely (ratio of coverage of adhesive material: H3) are each present as part of a region T where adhesive material is applied sparsely. The ratios of coverage of adhesive material in these regions satisfy a relationship: G>H1>H2>H3. The region T3 where adhesive material is applied even more sparsely is a region that is located further inward than the periphery of the surface Z and further outward than the region T2 where adhesive material is applied more sparsely. Moreover, the region T2 where adhesive material is applied more sparsely is a region that is located further inward than the region T3 where adhesive material is applied even more sparsely and further outward than the region T1 where adhesive material is applied sparsely. Furthermore, the region T1 where adhesive material is applied sparsely is a region that is located further inward than the region T2 where adhesive material is applied more sparsely and further outward than the region S where adhesive material is applied densely. Also, the region S where adhesive material is applied densely is a region that is located further inward than the region T1 where adhesive material is applied sparsely. By applying adhesive material at the surface Z in this manner, it is possible to cause the ratio of coverage of adhesive material at the surface Z to decrease gradually from the center of the surface Z toward the periphery of the surface Z.

Note that although the shape of the periphery at the outside of each region among the region S where adhesive material is applied densely, the region T1 where adhesive material is applied sparsely, and the region T2 where adhesive material is applied more sparsely is an elliptical shape in FIG. 7, this is not a limitation and a shape that is similar to the shape of the surface Z may be adopted, for example. Moreover, the shape of the periphery at the outside of each of the regions may have a center at the same position as the center R of the surface Z or may have a center at a different position from the center R of the surface Z.

Note that the central region P described above may be a region that matches the "region S where adhesive material is applied densely" or may be a region that does not match the "region S where adhesive material is applied densely". Accordingly, just a section corresponding to the "region S where adhesive material is applied densely" may be present in the central region P or both a section corresponding to the "region S where adhesive material is applied densely" and a section corresponding to the "region T where adhesive material is applied sparsely" may be present in the central region P.

Moreover, the other region Q described above may be a region that matches the "region T where adhesive material is applied sparsely" or may be a region that does not match the "region T where adhesive material is applied sparsely". Accordingly, just a section corresponding to the "region T where adhesive material is applied sparsely" may be present in the other region Q or both a section corresponding to the "region S where adhesive material is applied densely" and a section corresponding to the "region T where adhesive material is applied sparsely" may be present in the other region Q.

In a case in which both a section corresponding to the "region S where adhesive material is applied densely" and a section corresponding to the "region T where adhesive material is applied sparsely" are present in a region U that is either the central region P or the other region Q, the ratio of coverage of adhesive material in the region U can be determined by the following formula (3).

$$
\begin{aligned}
&\text{Ratio of coverage of adhesive material in region} \\
&U{=}(\text{Ratio of coverage of adhesive material in} \\
&\text{region } S)\times(\text{Proportion constituted by area of} \\
&\text{region } S \text{ among area of entire region } U){+}(\text{Ratio} \\
&\text{of coverage of adhesive material in region } T)\times \\
&(\text{Proportion constituted by area of region } T \\
&\text{among area of entire region } U)
\end{aligned} \tag{3}
$$

The ratio of coverage E of adhesive material in the central region P is preferably larger than the ratio of coverage F of adhesive material in the other region Q.

Specifically, the ratio of coverage E of adhesive material in the central region P is preferably 1.1% or more, more preferably 1.4% or more, and even more preferably 3% or more, and is preferably 30% or less, more preferably 10% or less, and even more preferably 8% or less. When the ratio of coverage E of adhesive material in the central region P is not less than any of the lower limits set forth above, cycle characteristics of the secondary battery can be further enhanced. On the other hand, when the ratio of coverage E of adhesive material in the central region P is not more than any of the upper limits set forth above, sufficiently high output characteristics of the secondary battery can be ensured.

The ratio of coverage F of adhesive material in the other region Q is preferably smaller than the ratio of coverage E of adhesive material in the central region P.

Specifically, the ratio of coverage F of adhesive material in the other region Q is preferably 0.3% or more, and more preferably 0.5% or more, and is preferably less than 0.4×E %. When the ratio of coverage F of adhesive material in the other region Q is not less than any of the lower limits set forth above, adhesive strength of an electrode and a separator can be sufficiently ensured. On the other hand, when the ratio of coverage F of adhesive material in the other region Q is less than the upper limit set forth above, cycle characteristics of the secondary battery can be further enhanced.

A ratio (E/F) of the ratio of coverage E of adhesive material in the central region P and the ratio of coverage F of adhesive material in the other region Q is preferably 1.6 or more, more preferably 2.0 or more, and even more preferably 2.6 or more, and is preferably 16.0 or less, more preferably 10.0 or less, and even more preferably 8.0 or less. When the ratio (E/F) of the ratio of coverage E of adhesive material in the central region P and the ratio of coverage F of adhesive material in the other region Q is not less than any of the lower limits set forth above, cycle characteristics of the secondary battery can be further enhanced. On the other hand, when the ratio (E/F) of the ratio of coverage E of adhesive material in the central region P and the ratio of coverage F of adhesive material in the other region Q is not more than any of the upper limits set forth above, a balance of high levels of adhesive strength of an electrode and a separator and output characteristics of the secondary battery can be achieved.

The coating weight of adhesive material in the central region P is preferably 0.02 g/m$^2$ or more, and is preferably 0.8 g/m$^2$ or less, and more preferably 0.35 g/m$^2$ or less. When the coating weight of adhesive material in the central region P is not less than the lower limit set forth above, adhesive strength of an electrode and a separator can be sufficiently ensured. Moreover, when the coating weight of adhesive material in the central region P is not more than any of the upper limits set forth above, sufficiently high output characteristics of the secondary battery can be ensured.

The coating weight of adhesive material in the other region Q is preferably 0.02 g/m$^2$ or more, and more preferably 0.03 g/m$^2$ or more, and is preferably 0.35 g/m$^2$ or less. When the coating weight of adhesive material in the other region Q is not less than any of the lower limits set forth above, adhesive strength of an electrode and a separator can be sufficiently ensured. Moreover, when the coating weight of adhesive material in the other region Q is not more than the upper limit set forth above, sufficiently high output characteristics of the secondary battery can be ensured.

—Details of Adhesive Material—

Any adhesive material that is used in the field of secondary batteries can be used as the adhesive material without any specific limitations so long as it does not impair battery reactions. In particular, an adhesive material formed of a polymer is preferable as the adhesive material. Note that the adhesive material may be formed of just one type of polymer or may be formed of two or more types of polymers.

Examples of polymers that can be used as the adhesive material include, but are not specifically limited to, fluoropolymers such as polyvinylidene fluoride and vinylidene fluoride-hexafluoropropylene copolymer (PVdF-HFP); conjugated diene polymers such as styrene-butadiene copolymer (SBR) and acrylonitrile-butadiene copolymer (NBR); hydrogenated products of conjugated diene polymers; polymers that include a (meth)acrylic acid alkyl ester monomer unit (acrylic polymers); and polyvinyl alcohol polymers such as polyvinyl alcohol (PVA).

Note that in the present disclosure, "(meth)acrylic acid" is used to indicate "acrylic acid" and/or "methacrylic acid".

The form of the adhesive material formed of a polymer is not specifically limited and may be a particulate form, a non-particulate form, or a combination of a particulate form and a non-particulate form.

Note that in a case in which the adhesive material formed of a polymer is a particulate polymer, the adhesive material of that particulate polymer may be monophase structure particles that are formed from a single polymer or may be heterophase structure particles that are formed through physical or chemical bonding of two or more different polymers.

Specific examples of heterophase structures include a core-shell structure in which a central portion (core portion) and an outer shell (shell portion) of a spherical particle are formed from different polymers; and a side-by-side structure in which two or more polymers are disposed alongside each other.

Figure 8:
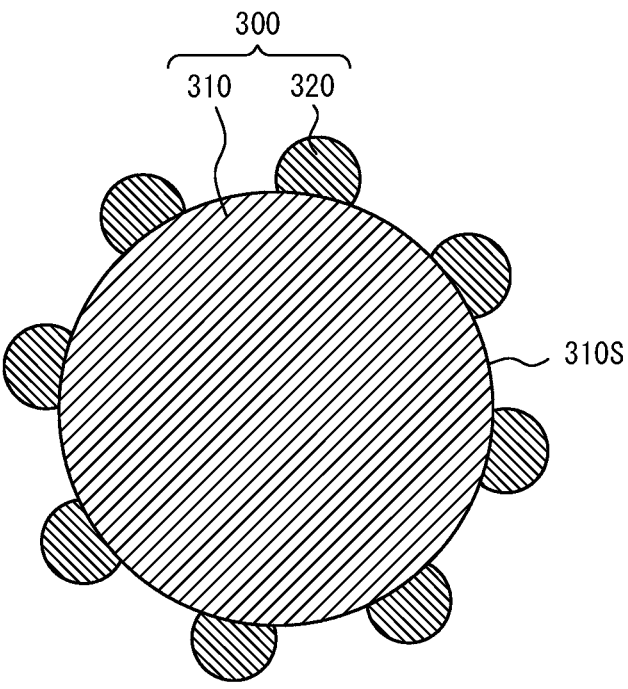
FIG. 8 is a cross-sectional view schematically illustrating the structure of one example of a particulate polymer.

Note that the term "core-shell structure" as used in the present disclosure is inclusive of a structure in which a shell portion completely covers an outer surface of a core portion and also of a structure in which a shell portion partially covers an outer surface of a core portion such as illustrated in FIG. 8, for example.

In terms of external appearance, even in a situation in which the outer surface of a core portion appears to be completely covered by a shell portion, the shell portion is still considered to be a shell portion that partially covers the outer surface of the core portion so long as pores are formed that pass between inside and outside of the shell portion. Accordingly, a particulate polymer that includes a shell portion having fine pores that pass between an outer surface of the shell portion (i.e., a circumferential surface of the particulate polymer) and an outer surface of a core portion, for example, corresponds to a particulate polymer in which a shell portion partially covers an outer surface of a core portion.

The degree of swelling in electrolyte solution (solution having LiPF$_6$ dissolved in a concentration of 1 mol/L in a mixed solvent of ethylene carbonate/diethyl carbonate in a volume ratio of 3/7) of the adhesive material (hereinafter, also referred to simply as the "degree of swelling") is preferably 110% or more, and is preferably 1500% or less, more preferably 1300% or less, and particularly preferably 1000% or less. When the degree of swelling of the adhesive material is not more than any of the upper limits set forth above, permeability of electrolyte solution to a central part of a positive electrode or a negative electrode can be improved.

Note that the degree of swelling in electrolyte solution of the adhesive material can be measured by a method described in the EXAMPLES section of the present specification.

—Particulate Polymer—

A particulate polymer is preferably used as the adhesive material. Although either of a particulate polymer having a core-shell structure and a particulate polymer not having a core-shell structure may be used as the particulate polymer, it is preferable to use at least a particulate polymer having a core-shell structure, and more preferable to use a particulate polymer having a core-shell structure and a particulate polymer not having a core-shell structure in combination.

In a case in which a particulate polymer having a core-shell structure and a particulate polymer not having a core-shell structure are used in combination, the mass ratio of the particulate polymer having a core-shell structure and the particulate polymer not having a core-shell structure in the adhesive material can be adjusted as appropriate to the extent that the desired effects are obtained.

=Particulate Polymer Having Core-Shell Structure=

The particulate polymer having a core-shell structure is a component that functions as a binder in adhesive material for adhering battery members, such as a separator and an electrode, to each other. By using the particulate polymer having a core-shell structure as a binder, battery members can be strongly adhered to each other via the adhesive material while also causing the secondary battery to display excellent output characteristics.

The particulate polymer has a core-shell structure including a core portion and a shell portion covering an outer surface of the core portion. The shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion.

FIG. 8 illustrates the cross-sectional structure of one example of the particulate polymer. A particulate polymer 300 illustrated in FIG. 8 has a core-shell structure including a core portion 310 and a shell portion 320. The core portion 310 is a portion that is further inward than the shell portion 320 in the particulate polymer 300. The shell portion 320 is a portion that covers an outer surface 310S of the core portion 310 and is normally an outermost portion in the particulate polymer 300. In the example illustrated in FIG. 8, the shell portion 320 partially covers the outer surface 310S of the core portion 310 rather than completely covering the outer surface 310S of the core portion 310.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization. However, from a viewpoint of more noticeably displaying the expected effects, it is preferable that the particulate polymer is composed of only the core portion and the shell portion.

The glass-transition temperature of a polymer of the core portion in the particulate polymer is preferably –30° C. or higher, and more preferably –20° C. or higher, and is preferably 200° C. or lower, more preferably 100° C. or lower, and particularly preferably 50° C. or lower. When the glass-transition temperature of the polymer of the core portion is –30° C. or higher, battery members can be more strongly adhered to each other via the adhesive material. On the other hand, when the glass-transition temperature of the polymer of the core portion is 200° C. or lower, polymerization stability of the particulate polymer can be ensured.

Note that the glass-transition temperature of a polymer can be measured by a method described in the EXAMPLES section of the present specification.

Also note that the glass-transition temperature of the polymer of the core portion can be adjusted by altering the types and proportions of monomers used to produce the polymer of the core portion, for example.

Examples of monomers that can be used to produce the polymer of the core portion include vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylic acid ester monomers such as methyl acrylate, ethyl acrylate, butyl acrylate, 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio.

Note that in the present disclosure, "(meth)acryl" is used to indicate "acryl" and/or "methacryl", whereas "(meth) acrylonitrile" is used to indicate "acrylonitrile" and/or "methacrylonitrile".

Of these monomers, the use of at least a (meth)acrylic acid ester monomer as a monomer used to produce the polymer of the core portion is preferable from a viewpoint of more strongly adhering battery members to each other via the adhesive material, with the combined use of a (meth) acrylic acid ester monomer and an aromatic vinyl monomer or the combined use of a (meth)acrylic acid ester monomer and a (meth)acrylonitrile monomer being more preferable, and the combined use of a (meth)acrylic acid ester monomer and an aromatic vinyl monomer being particularly preferable. In other words, the polymer of the core portion preferably includes at least a (meth)acrylic acid ester monomer unit, more preferably includes a (meth)acrylic acid ester monomer unit and an aromatic vinyl monomer unit or (meth)acrylonitrile monomer unit, and even more preferably includes a (meth)acrylic acid ester monomer unit and an aromatic vinyl monomer unit.

The phrase "includes a monomer unit" as used in the present disclosure means that "a polymer obtained with the monomer includes a repeating unit derived from the monomer".

Moreover, the term "(meth)acrylic acid ester monomer" as used in the present disclosure refers to a monofunctional (meth)acrylic acid ester monomer that includes only one group displaying polymerization reactivity.

The proportion constituted by a (meth)acrylic acid ester monomer unit in the polymer of the core portion when all repeating units (all monomer units) included in the polymer of the core portion are taken to be 100 mass % is, from a viewpoint of more strongly adhering battery members to each other via the adhesive material, preferably 5 mass % or more, more preferably 10 mass % or more, and particularly preferably 20 mass % or more, and is preferably 80 mass % or less, and more preferably 70 mass % or less.

Moreover, in a case in which the polymer of the core portion includes a (meth)acrylic acid ester monomer unit and an aromatic vinyl monomer unit, the proportion constituted by the aromatic vinyl monomer unit in the polymer of the core portion when all repeating units (all monomer units) included in the polymer of the core portion are taken to be 100 mass % is, from a viewpoint of more strongly adhering battery members to each other via the adhesive material, preferably 15 mass % or more, more preferably 20 mass % or more, and particularly preferably 25 mass % or more, and is preferably 95 mass % or less, more preferably 80 mass % or less, and particularly preferably 65 mass % or less.

Furthermore, in a case in which the polymer of the core portion includes a (meth)acrylic acid ester monomer unit and a (meth)acrylonitrile monomer unit, the proportion constituted by the (meth)acrylonitrile monomer unit in the polymer of the core portion when all repeating units (all monomer units) included in the polymer of the core portion are taken to be 100 mass % is, from a viewpoint of more strongly adhering battery members to each other via the adhesive material, preferably 5 mass % or more, more preferably 10 mass % or more, and particularly preferably 15 mass % or more, and is preferably 30 mass % or less, and more preferably 25 mass % or less.

The polymer of the core portion can also include an acid group-containing monomer unit. Examples of acid group-containing monomers include monomers that include an acid group such as carboxy group-containing monomers, sulfo group-containing monomers, and phosphate group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth) acryloyl" is used to indicate "acryloyl" and/or "methacryloyl".

Of these acid group-containing monomers, carboxy group-containing monomers are preferable, of which, monocarboxylic acids are preferable, and (meth)acrylic acid is more preferable.

One acid group-containing monomer may be used individually, or two or more acid group-containing monomers may be used in combination in a freely selected ratio.

The proportion constituted by an acid group-containing monomer unit in the polymer of the core portion when all repeating units (all monomer units) included in the polymer of the core portion are taken to be 100 mass % is preferably 0.1 mass % or more, and more preferably 1 mass % or more, and is preferably 15 mass % or less, and more preferably 10 mass % or less. By setting the proportion constituted by an acid group-containing monomer unit within any of the ranges set forth above, dispersibility of the polymer of the core portion can be increased in production of the particulate polymer, which facilitates formation of a shell portion partially covering the outer surface of the core portion with respect to the outer surface of the polymer of the core portion.

The polymer of the core portion preferably includes a cross-linkable monomer unit in addition to the monomer units described above. A cross-linkable monomer is a monomer that can form a cross-linked structure during or after polymerization by heating or by irradiation with energy rays.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth) acrylic acid ester monomers such as trimethylolpropane trimethacrylate and trimethylolpropane triacrylate; ethylenically unsaturated monomers that include an epoxy group such as allyl glycidyl ether and glycidyl methacrylate; and γ-methacryloxypropyltrimethoxysilane. Of these cross-linkable monomers, di(meth)acrylic acid ester monomers are more preferable. One of these cross-linkable monomers may be used individually, or two or more of these cross-linkable monomers may be used in combination in a freely selected ratio.

The proportion constituted by a cross-linkable monomer unit in the polymer of the core portion when all repeating units (all monomer units) included in the polymer of the core portion are taken to be 100 mass % is preferably 0.1 mass % or more, more preferably 0.2 mass % or more, and particularly preferably 0.4 mass % or more, and is preferably 10 mass % or less, more preferably 5 mass % or less, and particularly preferably 3 mass % or less. By setting the proportion constituted by a cross-linkable monomer unit within any of the ranges set forth above, battery members can be more strongly adhered to each other via the adhesive material.

The glass-transition temperature of a polymer of the shell portion in the particulate polymer is preferably 70° C. or higher, more preferably 80° C. or higher, and particularly preferably 90° C. or higher, and is preferably 140° C. or lower, more preferably 130° C. or lower, and particularly preferably 120° C. or lower. When the glass-transition temperature of the polymer of the shell portion is 70° C. or higher, output characteristics of the secondary battery can be improved. On the other hand, when the glass-transition temperature of the polymer of the shell portion is 140° C. or lower, battery members can be even more strongly adhered to each other via the adhesive material.

Note that the glass-transition temperature of the polymer of the shell portion can be adjusted by altering the types and proportions of monomers used to produce the polymer of the shell portion, for example.

The glass-transition temperature of the polymer of the shell portion is preferably at least 30° C. higher than the previously described glass-transition temperature of the polymer of the core portion, and more preferably at least 50° C. higher than the glass-transition temperature of the polymer of the core portion from a viewpoint of retaining the form of the particulate polymer after adhering battery members to each other and suppressing an increase of resistance.

Examples of monomers that can be used to produce the polymer of the shell portion include the same monomers as listed as examples of monomers that can be used to produce the polymer of the core portion. One of such monomers may be used individually, or two or more of such monomers may be used in combination in a freely selected ratio.

Of these monomers, the use of an aromatic vinyl monomer as a monomer used to produce the polymer of the shell portion is preferable from a viewpoint of more strongly adhering battery members to each other via the adhesive material. In other words, the polymer of the shell portion preferably includes an aromatic vinyl monomer unit.

The proportion constituted by an aromatic vinyl monomer unit in the polymer of the shell portion when all repeating units (all monomer units) included in the polymer of the shell portion are taken to be 100 mass % is, from a viewpoint of even more strongly adhering battery members to each other via the adhesive material, preferably 85 mass % or more, preferably 90 mass % or more, and particularly preferably 95 mass % or more, and is preferably 99 mass % or less.

Besides an aromatic vinyl monomer unit, the polymer of the shell portion can include an acid group-containing monomer unit. Examples of acid group-containing monomers include monomers that include an acid group such as carboxy group-containing monomers, sulfo group-containing monomers, and phosphate group-containing monomers. Specifically, examples of acid group-containing monomers that can be used include the same monomers as the acid group-containing monomers that can be used to form the core portion.

Of these acid group-containing monomers, carboxy group-containing monomers are preferable, of which, mono-carboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the polymer of the shell portion when all repeating units (all monomer units) included in the polymer of the shell portion are taken to be 100 mass % is preferably 0.1 mass % or more, and is preferably 15 mass % or less, more preferably 10 mass % or less, and particularly preferably 5 mass % or less. By setting the proportion constituted by an acid group-containing monomer unit within any of the ranges set forth above, dispersibility of the particulate polymer can be improved, and battery members can be even more strongly adhered to each other via the adhesive material.

A mass ratio of the polymer of the core portion and the polymer of the shell portion (core portion/shell portion) in the particulate polymer having a core-shell structure is preferably 5/5 or more, and more preferably 6/4 or more, and is preferably 9/1 or less, and more preferably 8/2 or less. When the mass ratio of the polymer of the core portion and the polymer of the shell portion (core portion/shell portion) is within any of the specific ranges set forth above, battery members can be more strongly adhered to each other via the adhesive material.

The volume-average particle diameter of the particulate polymer having a core-shell structure is preferably 100 nm or more, and more preferably 300 nm or more, and is preferably 1,000 nm or less, more preferably 900 nm or less, even more preferably 800 nm or less, and further preferably 700 nm or less. When the volume-average particle diameter of the particulate polymer having a core-shell structure is within any of the specific ranges set forth above, battery members can be more strongly adhered to each other via the adhesive material.

Note that the volume-average particle diameter of the particulate polymer can be measured by a method described in the EXAMPLES section of the present specification.

The particulate polymer having the core-shell structure described above can be produced by, for example, performing stepwise polymerization in which monomers for the polymer of the core portion and monomers for the polymer of the shell portion are used and in which the ratio of these monomers is changed over time. Specifically, the particulate polymer can be produced by continuous, multi-step emulsion polymerization or multi-step suspension polymerization in which a polymer of a preceding step is then covered by a polymer of a subsequent step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing monomers for forming the core portion and the emulsifier, and performing emulsion polymerization as one batch to obtain a particulate polymer that forms the core portion. The particulate polymer having the core-shell structure set forth above can then be obtained by performing polymerization of monomers for forming the shell portion in the presence of the particulate polymer forming the core portion.

In a case in which a particulate polymer in which the outer surface of a core portion is partially covered by a shell portion is to be produced, it is preferable that the monomers for forming the polymer of the shell portion are supplied into the polymerization system continuously or divided into a plurality of portions. As a result of the monomers for forming the polymer of the shell portion being supplied into the polymerization system in portions or continuously, the polymer forming the shell portion can be formed as particles that bond to the core portion such as to form a shell portion that partially covers the core portion.

=Particulate Polymer not Having Core-Shell Structure=

The adhesive material may contain a particulate polymer not having a core-shell structure in addition to the particulate polymer having the core-shell structure described above.

The glass-transition temperature of the particulate polymer not having a core-shell structure is preferably −40° C. or higher, more preferably −35° C. or higher, and even more preferably −30° C. or higher, and is preferably 0° C. or lower, more preferably −10° C. or lower, and even more preferably −20° C. or lower. When the glass-transition temperature of the particulate polymer not having a core-shell structure is −40° C. or higher, battery members can be more strongly adhered to each other via the adhesive material. On the other hand, when the glass-transition temperature of the particulate polymer not having a core-shell structure is 0° C. or lower, polymerization stability of the particulate polymer can be ensured.

Examples of monomers that can be used to produce the particulate polymer not having a core-shell structure include the same monomers as listed as examples of monomers that can be used to produce the polymer of the core portion of the particulate polymer having the core-shell structure described above. For example, it is preferable to use a (meth)acrylic acid ester monomer, an aromatic vinyl monomer, an acid group-containing monomer, a cross-linkable monomer, and the like as monomers used to produce the particulate polymer not having a core-shell structure. One of such monomers may be used individually, or two or more of such monomers may be used in combination in a freely selected ratio.

The proportion constituted by a (meth)acrylic acid ester monomer unit in the particulate polymer not having a core-shell structure when all repeating units (all monomer units) included in the polymer are taken to be 100 mass % is, from a viewpoint of more strongly adhering battery members to each other via the adhesive material, preferably 40 mass % or more, more preferably 50 mass % or more, and even more preferably 60 mass % or more, and is preferably 85 mass % or less, more preferably 80 mass % or less, and even more preferably 75 mass % or less.

The proportion constituted by an aromatic vinyl monomer unit in the particulate polymer not having a core-shell structure when all repeating units (all monomer units) included in the polymer are taken to be 100 mass % is, from a viewpoint of more strongly adhering battery members to each other via the adhesive material, preferably 10 mass % or more, more preferably 15 mass % or more, and even more preferably 20 mass % or more, and is preferably 40 mass % or less, more preferably 35 mass % or less, and even more preferably 30 mass % or less.

The proportion constituted by an acid group-containing monomer unit in the particulate polymer not having a core-shell structure when all repeating units (all monomer units) included in the polymer are taken to be 100 mass % is preferably 0.5 mass % or more, more preferably 1 mass % or more, and even more preferably 2 mass % or more, and is preferably 10 mass % or less, more preferably 7 mass % or less, and even more preferably 5 mass % or less. By setting the proportion constituted by an acid group-containing monomer unit in the particulate polymer not having a core-shell structure within any of the ranges set forth above, dispersibility of the particulate polymer can be increased.

The proportion constituted by a cross-linkable monomer unit in the particulate polymer not having a core-shell structure when all repeating units (all monomer units) included in the polymer are taken to be 100 mass % is, from a viewpoint of more strongly adhering battery members to each other via the adhesive material, preferably 0.2 mass % or more, more preferably 0.5 mass % or more, and even more preferably 1 mass % or more, and is preferably 5 mass % or less, more preferably 4 mass % or less, and even more preferably 3 mass % or less.

The volume-average particle diameter of the particulate polymer not having a core-shell structure is preferably 50 nm or more, and more preferably 100 nm or more, and is preferably 600 nm or less. When the volume-average particle diameter of the particulate polymer not having a core-shell structure is within any of the specific ranges set forth above, battery members can be more strongly adhered to each other via the adhesive material.

The particulate polymer not having a core-shell structure can be produced, for example, through polymerization of a monomer composition containing the monomers described above, carried out in an aqueous solvent such as water, for example, but is not specifically limited to being produced in this manner. The proportion constituted by each monomer in the monomer composition is normally the same as the proportion constituted by each monomer unit in the particulate polymer not having a core-shell structure. Commonly known polymerization methods and polymerization reactions can be adopted as the polymerization method and the polymerization reaction without any specific limitations.

—Other Details—

Adhesive material that is present in the central region P and adhesive material that is present in the other region Q may be the same or different.

Accordingly, the same adhesive material may be applied in both the previously described "region S where adhesive material is applied densely" and "region T where adhesive material is applied sparsely", or different adhesive materials may be applied in these regions.

Although the preceding "Application method of adhesive material" section describes a case in which adhesive material is applied such that a "region S where adhesive material is applied densely" and a "region T where adhesive material is applied sparsely" are present at the surface Z, the laminate in the presently disclosed secondary battery is not limited to this case, and adhesive material may be applied such that an "application region S1" is present instead of the "region S where adhesive material is applied densely" and an "application region S2" is present instead of the "region T where adhesive material is applied sparsely". In other words, adhesive material may be applied such that an "application region S1" and an "application region S2" are present at the surface Z.

The ratio of coverage and/or coating weight of adhesive material in each of the "application region S1" and the "application region S2" can be set within the same ranges as the preferred ranges for the ratio of coverage and/or coating weight of adhesive material in the previously described "region S where adhesive material is applied densely". Moreover, adhesive material may be applied such that the ratio of coverage and/or coating weight of adhesive material are the same in both the "application region S1" and the "application region S2".

Adhesive material that is applied in the "application region S1" and adhesive material that is applied in the "application region S2" are set as different adhesive materials. Through appropriate selection of different adhesive materials as the adhesive material applied in the "application region S1" and the adhesive material applied in the "application region S2", it is possible to make the resistance A per unit area of the central region P larger than the resistance B per unit area of the other region Q.

For example, a particulate polymer M1 and a particulate polymer M2 that differ in terms of degree of swelling can be used as the adhesive material applied in the "application region S1" and the adhesive material applied in the "application region S2".

The degree of swelling in electrolyte solution (solution having $LiPF_6$ dissolved in a concentration of 1 mol/L in a mixed solvent of ethylene carbonate/diethyl carbonate in a volume ratio of 3/7) of the particulate polymer M1 contained in the adhesive material that is applied in the "application region S1" is preferably 800% or more, and more preferably 1000% or more, and is preferably 1300% or less.

Moreover, the degree of swelling in electrolyte solution (solution having $LiPF_6$ dissolved in a concentration of 1 mol/L in a mixed solvent of ethylene carbonate/diethyl carbonate in a volume ratio of 3/7) of the particulate polymer M2 contained in the adhesive material that is applied in the "application region S2" is preferably 110% or more, and is preferably less than 800%, more preferably 500% or less, and even more preferably 300% or less.

Through the degrees of swelling of the particulate polymers M1 and M2 being within any of the specific ranges set forth above, it is possible to make the resistance A per unit area of the central region P larger than the resistance B per unit area of the other region Q.

Note that particulate polymers having a core-shell structure such as previously described in the "Details of adhesive material" section can, for example, be used as the particulate polymers M1 and M2. Of particulate polymers having a core-shell structure such as previously described, a particulate polymer in which the polymer of the core portion includes a (meth)acrylic acid ester monomer unit and a (meth)acrylonitrile monomer unit is preferable as the particulate polymer M1, whereas a particulate polymer in which the polymer of the core portion includes a (meth) acrylic acid ester monomer unit and an aromatic vinyl monomer unit is preferable as the particulate polymer M2.

Moreover, particulate polymers having different structures may be used as the adhesive material applied in the "application region S1" and the adhesive material applied in the "application region S2", for example. More specifically, a particulate polymer having a core-shell structure may be used as a particulate polymer M3 that is contained in the adhesive material applied in the "application region S1" and a particulate polymer not having a core-shell structure may be used as a particulate polymer M4 that is contained in the adhesive material applied in the "application region S2". Note that a particulate polymer having a core-shell structure such as previously described in the "Details of adhesive material" section, for example, can be used as the particulate polymer M3. Moreover, a particulate polymer composed of only a polymer having the same chemical composition as the polymer of a core portion in a particulate polymer having a core-shell structure such as previously described in the "Details of adhesive material" section, for example, can be used as the particulate polymer M4.

<<Production Method of Laminate>>

A method of producing the laminate in the presently disclosed secondary battery includes a step (A) of producing an affixed body and a step (B) of cutting the affixed body and, in a case in which the affixed body produced in the step (A) does not include a positive electrode, may optionally further include a step (C) of affixing a positive electrode to a cut body obtained through cutting of the affixed body in the step (B).

[Step (A)]

The affixed body produced in the step (A) may be (I) or (II) described below.

(I) An affixed body (hereinafter, also referred to as "affixed body (I)") that includes an elongated negative electrode web or a negative electrode (hereinafter, the "negative electrode web or negative electrode" is also referred to as a "negative electrode material"), an elongated first separator web affixed to one surface of the negative electrode material, and an elongated second separator web affixed to the other surface of the negative electrode material, and optionally includes a positive electrode affixed to a surface of the first separator web at the opposite side thereof to the negative electrode material (II) An affixed body (hereinafter, also referred to as "affixed body (II)") that includes a negative electrode material formed of an elongated negative electrode web, an elongated first separator web, a positive electrode, and an elongated second separator web affixed in stated order In the method of producing the laminate in the presently disclosed secondary battery, a laminate that includes a negative electrode, a first separator affixed to one surface of the negative electrode, a positive electrode affixed to a surface of the first separator at the opposite side thereof to the negative electrode, and a second separator affixed to the other surface of the negative electrode such as illustrated in FIGS. 1A and 1B, for example, is normally obtained in a case in which the affixed body (I) is produced in the step (A).

Also note that in a case in which the affixed body (I) does not include a positive electrode, the step (C) is normally performed after the step (B) to produce a laminate in the method of producing the laminate in the presently disclosed secondary battery.

Moreover, in the method of producing the laminate in the presently disclosed secondary battery, a laminate that includes a negative electrode, a first separator affixed to one surface of the negative electrode, a positive electrode affixed to a surface of the first separator at the opposite side thereof to the negative electrode, and a second separator affixed to a surface of the positive electrode at the opposite side thereof to the first separator such as illustrated in FIG. 3, for example, is normally obtained in a case in which the affixed body (II) is produced in the step (A).

Production of an affixed body in the step (A) is normally carried out by applying adhesive material at an affixing surface of members that are to be affixed to each other, and then affixing members of the affixed body to each other via the adhesive material. In other words, the step (A) includes a step (a1) of applying adhesive material at an affixing surface Y of a negative electrode material and a separator web that is to be affixed to the negative electrode material and can further include a step (a2) of applying adhesive material at an affixing surface X of a separator web and a positive electrode.

Note that the "separator web that is to be affixed to the negative electrode material" is a first separator web and a second separator web in a case in which the affixed body that is to be produced is the affixed body (I) and is a first separator web in a case in which the affixed body that is to be produced is the affixed body (II). Moreover, the member onto which adhesive material is applied may be just one of the members that are to be affixed to each other or may be both of the members that are to be affixed to each other.

Figure 9:
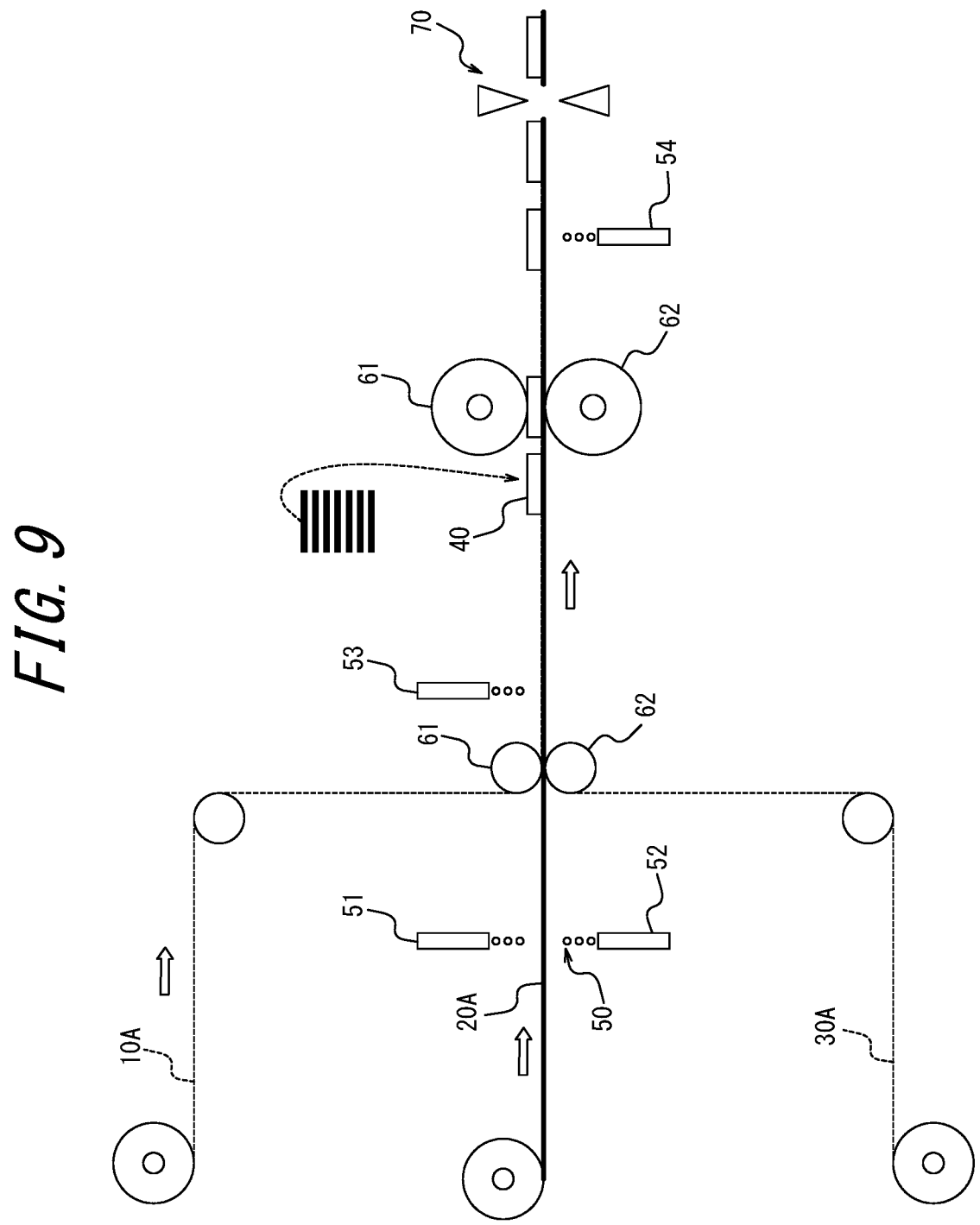
FIG. 9 is an explanatory diagram illustrating one example of a production process of a laminate in a presently disclosed secondary battery.

Specifically, the affixed body (I) can be produced as illustrated in FIG. 9, for example, in the step (A).

In FIG. 9, an elongated first separator web 10A that has been fed from a first separator web roll is affixed to one surface of a negative electrode material formed of an elongated negative electrode web 20A that has been fed from a negative electrode web roll via adhesive material that has been supplied from a coating machine 51, and an elongated second separator web 30A that has been fed from a second separator web roll is affixed to the other surface of the negative electrode material formed of the negative electrode web 20A via adhesive material that has been supplied from a coating machine 52. Note that the affixing can be performed using pressure bonding rollers 61 and 62, for example. Positive electrodes 40 are affixed at a specific arrangement pitch to a surface of the first separator web 10A at the opposite side thereof to the negative electrode web 20A via adhesive material that has been supplied from a coating machine 53, and, in this manner, an affixed body (I) that includes a positive electrode is obtained.

Note that in FIG. 9, adhesive material is supplied from a coating machine 54 to a surface of the second separator web 30A at the opposite side thereof to the negative electrode web 20A so that when laminates obtained by cutting the affixed body between positive electrodes 40 that are adjacent in the longitudinal direction are stacked in order to produce a stack, the laminates can b e adhered well to each other.

Figure 10:
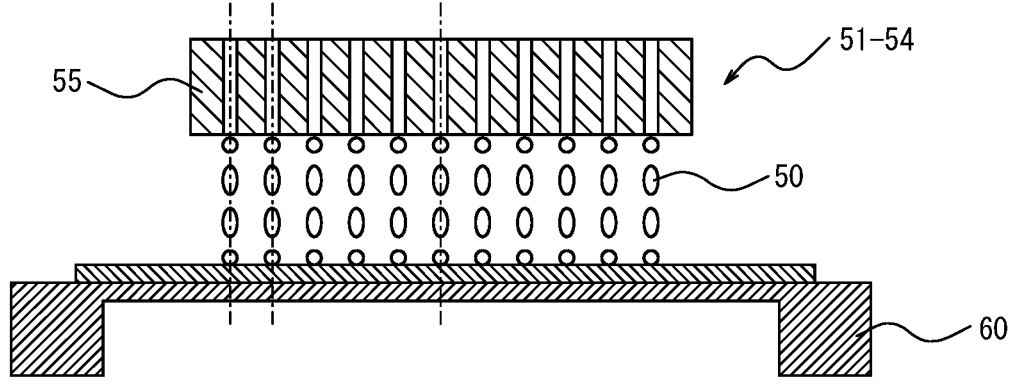
FIG. 10 is an explanatory diagram illustrating one example of a coating machine (nozzle head) illustrated in FIG. 9.

FIG. 10 is an explanatory diagram illustrating one example of a coating machine (nozzle head) illustrated in FIG. 9.

In FIG. 10, droplets 50 of adhesive material are applied onto a substrate 60 via nozzles 55 of a coating machine 51-54.

Note that the method by which an affixed body is produced in the step (A) is not limited to the example described above. For example, the coating machine 54 may supply adhesive material to a cut body obtained after cutting of the affixed body in FIG. 9.

—Negative Electrode Material and Positive Electrode—

An electrode that is obtained by cutting an elongated electrode web (negative electrode web or positive electrode web) can be used as an electrode (negative electrode or positive electrode) without any specific limitations. Moreover, an electrode web that is formed of an electrode substrate having an electrode mixed material layer (negative electrode mixed material layer or positive electrode mixed material layer) formed at one surface or both surfaces of an elongated current collector or an electrode web that has a porous membrane layer further formed on an electrode mixed material layer of an electrode substrate can be used as an electrode web (negative electrode web or positive electrode web).

Note that any current collector, electrode mixed material layer, and porous membrane layer that can be used in the field of secondary batteries, such as any of those described in JP2013-145763A, for example, can be used as the current collector, electrode mixed material layer, and porous membrane layer without any specific limitations. The porous membrane layer is a layer that contains non-conductive particles such as described in JP2013-145763A, for example.

—Separator Web—

A separator web that is formed of an elongated separator substrate or a separator web that has a porous membrane layer formed at one surface or both surfaces of an elongated separator substrate can, for example, be used as a separator web without any specific limitations.

Note that any separator substrate and porous membrane layer that can be used in the field of secondary batteries, such as any of those described in JP2012-204303A and JP2013-145763A, for example, can be used as the separator substrate and the porous membrane layer without any specific limitations.

In the step (a1) in which adhesive material is applied at an affixing surface Y with a separator web that is to be affixed to the negative electrode material or in the step (a2) in which adhesive material is applied at an affixing surface X with a separator web that is to be affixed to the positive electrode, it is preferable that adhesive material is applied at a surface Z, which is either or both of the affixing surfaces X and Y, such that a ratio of coverage E of adhesive material in a central region P that has a center at the same position as the center R of the surface Z, that has a similar shape to a shape of the surface Z, and that has an area equivalent to 10% of the area of the surface Z is larger than a ratio of coverage F of adhesive material in another region Q that is a region other than the central region P at the surface Z. As a result, cycle characteristics of the secondary battery can be further enhanced.

The method by which adhesive material is applied at the surface Z such that the ratio of coverage E of adhesive material in the central region P is larger than the ratio of coverage F of adhesive material in the other region Q may, for example, be a method of applying adhesive material that was previously described in the "Surface Z, central region P, and other region Q" section. Moreover, ranges for values of the ratio of coverage E of adhesive material in the central region P, the ratio of coverage F of adhesive material in the other region Q, and the ratio (E/F) of the ratio of coverage E and the ratio of coverage F can also be set within any of the suitable ranges that were previously described in the same section.

In the step (a2), adhesive material is applied at an affixing surface of a separator web and a positive electrode.

Specifically, adhesive material is applied at an affixing surface of a separator web and a positive electrode in the step (a2) in a case in which an affixed body including a positive electrode is to be produced in the step (A) (for example, FIG. 9) and in a case in which an affixed body having adhesive material pre-applied at a position where a positive electrode is to be affixed after cutting (i.e., an affixed body not including a positive electrode) is to be produced in the step (A).

In other words, in FIG. 9, for example, adhesive material is applied from the coating machine 53 to an affixing surface of the first separator web 10A and the positive electrode 40.

Note that in the step (A), adhesive material may be supplied to one surface of the affixed body as illustrated in FIG. 9 (surface of second separator web 30A at opposite side thereof to negative electrode web 20A in FIG. 9), for example, in order to enable good adhesion of laminates to each other when laminates are stacked to produce a stack.

[Step (B)]

In the step (B), the affixed body is cut using a cutting machine 70. Note that in a case in which an affixed body that includes a positive electrode is cut in the step (B), the resultant cut bodies are each a laminate.

The cutting machine 70 can be any cutting machine that can be used in the field of secondary battery production, such as a cutting machine that cuts the affixed body by sandwiching the affixed body with cutting blades from both sides in a thickness direction of the affixed body.

In the step (B) implemented after the step (A), the affixed body can be cut well while also inhibiting curling of a separator from a negative electrode as previously described.

[Step (C)]

In the step (C) that is optionally implemented, a positive electrode is affixed to a cut body obtained through cutting of the affixed body in the step (B) to obtain a laminate in a case in which an affixed body that does not include a positive electrode has been cut in the step (B).

<Electrolyte Solution>

An organic electrolyte solution in which a supporting electrolyte is dissolved in an organic solvent is normally used as an electrolyte solution. A lithium salt can be used as the supporting electrolyte in a case in which the secondary battery is a lithium ion secondary battery, for example. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$.

Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The presently disclosed secondary battery can be produced by, for example, performing rolling, folding, or the like, in accordance with the battery shape, with respect to a stack obtained through stacking of laminates, as necessary, to place the stack in a device container (battery container), injecting the electrolyte solution into the device container, and sealing the device container. Note that the stack may be a laminate used in that form or may be produced through stacking of a plurality of laminates. Moreover, the stack may be produced by stacking a laminate and an additional battery member (for example, an electrode and/or a separator). In order to prevent internal pressure increase and occurrence of overcharging or overdischarging, an overcurrent preventing device such as a fuse or a PTC device, an expanded metal, a lead plate, or the like may be provided in the presently disclosed secondary battery as necessary. The shape of the secondary battery may be a coin type, button type, sheet type, cylinder type, prismatic type, flat type, or the like.

(Method of Producing Secondary Battery)

The presently disclosed method of producing a secondary battery is a method of producing a secondary battery including a laminate in which a positive electrode, a separator, and a negative electrode are stacked in stated order. A feature of the presently disclosed method of producing a secondary battery is that it includes a step (application step) of applying adhesive material with a specific condition at a surface Z that is either or both of an affixing surface X of the positive electrode and the separator and an affixing surface Y of the negative electrode and the separator.

Through the presently disclosed method of producing a secondary battery, it is possible to produce a secondary battery having excellent cycle characteristics.

Moreover, through the presently disclosed production method, it is possible to efficiently produce the presently disclosed secondary battery set forth above.

Note that the presently disclosed method of producing a secondary battery may include other steps besides the application step described above.

<Application Step>

In the application step, adhesive material is applied at a surface Z that is either or both of an affixing surface X of the positive electrode and the separator and an affixing surface Y of the negative electrode and the separator such that a ratio of coverage E of adhesive material in a central region P that has a similar shape to a shape of the surface Z, that has a center at the same position as a center of the surface Z, that has an area equivalent to 10% of the area of the surface Z is larger than a ratio of coverage F of adhesive material in another region Q that is a region other than the central region P at the surface Z.

Note that the method by which adhesive material is applied at the surface Z such that the ratio of coverage E of adhesive material in the central region P is larger than the ratio of coverage F of adhesive material in the other region Q may be a method of applying adhesive material that was previously described in the "Secondary battery" section, for example.

Moreover, ranges for values of the ratio of coverage E of adhesive material in the central region P, the ratio of coverage F of adhesive material in the other region Q, and the ratio (E/F) of the ratio of coverage E and the ratio of coverage F can also be set within any of the suitable ranges that were previously described in the "Secondary battery" section.

Furthermore, the positive electrode, separator, negative electrode, and adhesive material used in the application step may be those that were previously described in the "Secondary battery" section.

<Other Steps>

Examples of other steps include a stacking step and an assembly step.

<<Stacking Step>>

In the stacking step, the positive electrode, the separator, and the negative electrode are stacked in stated order to obtain a laminate after adhesive material has been applied at the surface Z with the specific condition set forth above.

Note that the laminate can be obtained using the method of producing a laminate previously described in the "Secondary battery" section by implementing the application step and the stacking step as some of the steps in that method of producing a laminate.

<<Assembly Step>>

The assembly step is a step in which a laminate and electrolyte solution are used to assemble a secondary battery and may, for example, be a step in which a secondary battery is assembled by further stacking additional battery members (for example, an electrode and/or a separator), as necessary, with a stack that has been obtained by stacking laminates, subsequently placing the resultant laminate in a battery container, injecting electrolyte solution into the battery container, and sealing the battery container.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the production examples, examples, and comparative examples, the following methods were used to measure and evaluate glass-transition temperature, volume-average particle diameter, degree of swelling, shape of adhesive material, coating weight in an application region, dry adhesive strength of an electrode and a separator, cycle characteristics of a secondary battery, and output characteristics.

<Glass-Transition Temperature>

A water dispersion of a particulate polymer produced in each of Production Examples 1 to 6 was dried at a temperature of 130° C. for 1 hour to obtain a sample. After weighing 10 mg of the measurement sample into an aluminum pan, measurement thereof was performed in a differential scanning calorimeter (EXSTAR DSC6220 produced by SII NanoTechnology Inc.) under conditions prescribed in JIS Z8703, with a measurement temperature range of –100° C. to 200° C. and a heating rate of 10° C./min, so as to obtain a differential scanning calorimetry (DSC) curve. Note that an empty aluminum pan was used as a reference. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter>

The volume-average particle diameter of a particulate polymer produced in each production example was measured by laser diffraction. Specifically, a produced water dispersion of particles (solid content concentration: 0.1 mass %) was used as a sample, and, in a particle size distribution (by volume) that was obtained using a laser diffraction particle diameter distribution analyzer (produced by Beckman Coulter, Inc.; product name: LS-13 320), the particle diameter at which cumulative volume calculated from a small diameter end of the distribution reached 50% was determined and was taken to be the volume-average particle diameter D50 (nm).

<Degree of Swelling>

A water dispersion of a particulate polymer produced in each production example was dried, and then approximately 0.2 g of the dried product that was obtained was pressed under pressing conditions of a temperature of 200° C. and a pressure of 5 MPa for 2 minutes to obtain a film. The obtained film was cut up to obtain a 1 cm square as a test specimen, and the mass W2 (g) of this test specimen was measured. Next, the test specimen was immersed in electrolyte solution (solution having $LiPF_6$ dissolved in a concentration of 1 mol/L in a mixed solvent of ethylene carbonate/diethyl carbonate in a volume ratio of 3/7) at a temperature of 60° C. for 72 hours. The test specimen was subsequently removed from this mixed solvent, mixed solvent on the surface thereof was wiped off, and the mass W3 (g) of the test specimen was measured. The degree of swelling (%) was then calculated by the following formula.

$$\text{Degree of Swelling (\%)} = W3/W2 \times 100$$

<Shape of Adhesive Material>

The shape of adhesive material that had been applied at an affixing surface was observed using a laser microscope (VR-3100 produced by Keyence Corporation).

<Coating Weight of Adhesive Material>

The coating weight of adhesive material in each region was determined from the difference in mass per unit area between before supply of a composition for adhesion and after supply and drying of the composition for adhesion.

<Adhesive Strength of Electrode and Separator>

A laminate obtained after a separator and a negative electrode having adhesive material applied at one surface under the same conditions as in each example or comparative example had been pressed under pressing conditions of a temperature of 70° C. and a pressure of 1 MPa for 10 seconds and affixed to each other (i.e., a laminate in which one negative electrode and one separator were affixed via adhesive material) was sampled to obtain a test specimen.

The test specimen was placed with the surface at the current collector side of the negative electrode facing downward, and cellophane tape was affixed to the surface at the current collector side of the negative electrode. Tape prescribed by JIS Z1522 was used as the cellophane tape. Moreover, the cellophane tape was secured to a horizontal test stage in advance. The stress when the separator was peeled off by pulling one end of the separator vertically upward at a pulling speed of 50 mm/min was measured.

A total of 6 measurements were made in this manner, an average value of the stress was determined as the peel strength, and adhesiveness of the negative electrode and the separator was evaluated by the following standard. A larger peel strength indicates higher adhesiveness of the electrode (negative electrode) and the separator.

A: Peel strength of 1.5 N/m or more

B: Peel strength of not less than 1.0 N/m and less than 1.5 N/m

C: Peel strength of not less than 0.5 N/m and less than 1.0 N/m

D: Peel strength of less than 0.5 N/m

<Cycle Characteristics of Secondary Battery>

A lithium ion secondary battery produced in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage: 4.30 V) and CC discharging of the lithium ion secondary battery was performed to 3.00 V by a 0.2 C constant-current method.

Thereafter, the lithium ion secondary battery was subjected to 100 cycles of a charge/discharge operation between cell voltages of 4.30 V and 3.00 V with a 1.0 C charge/discharge rate in an environment having a temperature of 45° C. The capacity of the $1^{st}$ cycle (i.e., the initial discharge capacity X1) and the discharge capacity X2 of the $100^{th}$ cycle were measured, and a capacity maintenance rate (%) (=(X2/X1)×100) was calculated and was evaluated by the following standard. A larger value for the capacity maintenance rate indicates that the secondary battery has better cycle characteristics.

A: Capacity maintenance rate of 90% or more
B: Capacity maintenance rate of not less than 85% and less than 90%
C: Capacity maintenance rate of not less than 80% and less than 85%
D: Capacity maintenance rate of less than 80%

<Output Characteristics>

A produced lithium ion secondary battery was constant-current constant-voltage (CCCV) charged to 4.3 V in an atmosphere having a temperature of 25° C. for cell preparation. The prepared cell was discharged to 3.0 V by 0.2 C and 1 C constant-current methods in an atmosphere having a temperature of −10° C., and the electric capacity for each thereof was determined. A discharge capacity maintenance rate expressed by the ratio of the electric capacities (=(electric capacity at 1 C/electric capacity at 0.2 C)×100(%)) was determined. These measurements were performed for 5 lithium ion secondary battery cells, and an average value for the determined discharge capacity maintenance rates was evaluated by the following standard as an output characteristic. A larger value indicates a better output characteristic.

A: Average value for discharge capacity maintenance rate of 80% or more
B: Average value for discharge capacity maintenance rate of not less than 70% and less than 80%
C: Average value for discharge capacity maintenance rate of not less than 60% and less than 70%
D: Average value for discharge capacity maintenance rate of less than 60%

Production Example 1

<Production of particulate Polymer 1>

A reactor including a stirrer was supplied with 100 parts of deionized water and 0.3 parts of ammonium persulfate, the gas phase was purged with nitrogen gas, and the temperature was raised to 80° C. Meanwhile, a monomer composition for core portion formation was obtained in a separate vessel by mixing 40 parts of deionized water, 0.2 parts of sodium dodecylbenzenesulfonate as an emulsifier, 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer. The monomer composition for core portion formation was continuously added into the reactor over 3 hours so as to perform a polymerization reaction at a temperature of 80° C. Polymerization was continued until a polymerization conversion rate of 95% was reached to yield a water dispersion containing a particulate polymer forming a core portion. Next, a monomer composition for shell portion formation containing 29.7 parts of styrene as an aromatic monovinyl monomer and 0.3 parts of methacrylic acid as an acidic group-containing monomer was continuously supplied into the water dispersion over 60 minutes so as to continue polymerization. At the point at which the polymerization conversion rate reached 98%, the reaction was quenched by cooling to produce a water dispersion containing a particulate polymer 1.

The volume-average particle diameter, degree of swelling, and glass-transition temperature of the obtained particulate polymer 1 were measured. The results are shown in Table 1.

Upon observation of the cross-sectional structure of the particulate polymer using a transmission electron microscope (TEM), the particulate polymer was confirmed to have a core-shell structure in which a shell portion partially covered the outer surface of a core portion.

Production Example 2

<Production of Particulate Polymer 2>

A water dispersion of a particulate polymer 2 having a core-shell structure was produced in the same way as in Production Example 1 with the exception that, in production of the particulate polymer in Production Example 1, a monomer composition for core portion formation containing 17.0 parts of methyl methacrylate and 36.1 parts of butyl acrylate as monofunctional (meth)acrylic acid ester monomers, 14.0 parts of acrylonitrile as a (meth)acrylonitrile monomer, 2.8 parts of methacrylic acid as an acidic group-containing monomer, and 0.1 parts of ethylene glycol dimethacrylate as a cross-linkable monomer was used instead of the monomer composition for core portion formation containing 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer. Various measurements were performed in the same manner as in Production Example 1. The results are shown in Table 1.

<Production of Particulate Polymer 3>

A water dispersion of a particulate polymer 3 not having a core-shell structure was produced in the same way as in Production Example 1 with the exception that, in production of the particulate polymer in Production Example 1, a monomer composition containing 57.6 parts of styrene as an aromatic monovinyl monomer, 39.0 parts of 2-ethylhexyl acrylate as a monofunctional (meth)acrylic acid ester monomer, 3.0 parts of methacrylic acid as an acidic group-containing monomer, and 0.4 parts of ethylene glycol dimethacrylate as a cross-linkable monomer was used instead of the monomer composition for core portion formation containing 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic group-containing monomer, and 0.3 parts of ethylene glycol dimethacrylate as a cross-linkable monomer, and the monomer composition for shell portion formation was not supplied. Various measurements were performed in the same manner as in Production Example 1. The results are shown in Table 1.

Production Example 4

<Production of Particulate Polymer 4>

A reactor including a stirrer was supplied with 90 parts of deionized water and 0.5 parts of ammonium persulfate, the gas phase was purged with nitrogen gas, and the temperature was raised to 80° C. Meanwhile, a monomer composition was obtained in a separate vessel by mixing 15 parts of deionized water, 1.0 parts of NEOPELEX G15 (produced by Kao Corporation) as an emulsifier, 70.0 parts of 2-ethylhexyl acrylate as a monofunctional (meth)acrylic acid ester monomer, 25.0 parts of styrene as an aromatic monovinyl monomer, 1.7 parts of allyl glycidyl ether and 0.3 parts of allyl methacrylate as cross-linkable monomers, and 3.0 parts of acrylic acid as an acidic group-containing monomer.

The monomer composition was continuously added into the reactor over 4 hours to perform polymerization. The reaction was performed at 80° C. during this addition. Once the addition was complete, a further 3 hours of stirring was performed at a temperature of 80° C. to complete the reaction.

The resultant water dispersion was cooled to a temperature of 25° C. and was subsequently adjusted to pH 8.0 through addition of sodium hydroxide aqueous solution. Unreacted monomer was then removed through introduction of steam so as to yield a water dispersion of a particulate polymer 4 not having a core-shell structure. Various measurements were performed in the same manner as in Production Example 1. The results are shown in Table 1.

Production Example 5

A water dispersion of a particulate polymer 5 having a core-shell structure was produced in the same way as in Production Example 1 with the exception that, in production of the particulate polymer in Production Example 1, a monomer composition for core portion formation containing 20.2 parts of styrene as an aromatic monovinyl monomer, 47.6 parts of 2-ethylhexyl acrylate as a monofunctional (meth)acrylic acid ester monomer, 2.1 parts of methacrylic acid as an acidic group-containing monomer, and 0.1 parts of ethylene glycol dimethacrylate as a cross-linkable monomer was used instead of the monomer composition for core portion formation containing 40.3 parts of styrene as an aromatic monovinyl monomer, 27.3 parts of 2-ethylhexyl acrylate as a monofunctional (meth)acrylic acid ester monomer, 2.1 parts of methacrylic acid as an acidic groupcontaining monomer, and 0.3 parts of ethylene glycol dimethacrylate as a cross-linkable monomer. Various measurements were performed in the same manner as in Production Example 1. The results are shown in Table 1.

Production Example 6

A water dispersion of a particulate polymer 6 having a core-shell structure was produced in the same way as in Production Example 5 with the exception that, in production of the particulate polymer in Production Example 5, 0.03 parts of sodium dodecylbenzenesulfonate as an emulsifier was supplied into the reactor including a stirrer in addition to 100 parts of deionized water and 0.3 parts of ammonium persulfate. Various measurements were performed in the same manner as in Production Example 1. The results are shown in Table 1.

Example 1

<Production of Composition for Adhesion>

The water dispersion of the particulate polymer 1 obtained in Production Example 1 and the water dispersion of the particulate polymer 4 obtained in Production Example 4 were mixed such that the mass ratio thereof in terms of solid content was 100:10 and were then diluted to a solid content concentration of 10.5% through addition of deionized water. Propylene glycol was further added to the resultant mixture to adjust the solid content concentration to 10%, and thereby obtain a composition for adhesion 1.

<Production of Negative Electrode Web>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to a temperature of 50° C. to initiate polymerization. At the point at which the polymerization conversion rate reached 96%, the reaction was quenched by cooling to obtain a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to a temperature of 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then further mixed at a temperature of 25° C. for 60 minutes. The solid content concentration was further adjusted to 62% with deionized water and then a further 15 minutes of mixing was performed at a temperature of 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto both surfaces of copper foil (current collector) of 20 μm in thickness using a comma coater such as to have a thickness after drying of approximately 150 μm. The applied slurry composition was dried by conveying the copper foil inside an oven having a temperature of 60° C. for 2 minutes at a speed of 0.5 m/min. Thereafter, 2 minutes of heat treatment was performed at a temperature of 120° C. to obtain a pre-pressing negative electrode web. The pre-pressing negative electrode web was rolled by roll pressing to obtain a post-pressing negative electrode web having a negative electrode mixed material layer thickness of 80 μm.

<Production of Positive Electrode Web>

A slurry composition for a secondary battery positive electrode was obtained by mixing 100 parts of LiCoO₂ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto both surfaces of aluminum foil (current collector) of 20 μm in thickness using a comma coater such as to have a thickness after drying of approximately 150 μm. The applied slurry composition was dried by conveying the aluminum foil inside an oven having a temperature of 60° C. for 2 minutes at a speed of 0.5 m/min. Thereafter, 2 minutes of heat treatment was performed at a temperature of 120° C. to obtain a positive electrode web.

The obtained positive electrode web was rolled by a roll press to obtain a post-pressing positive electrode web including positive electrode mixed material layers.

<Preparation of Separator Web>

A separator web (product name: Celgard 2500) made of polypropylene (PP) was prepared.

<Production of Laminate>

Figure 11:
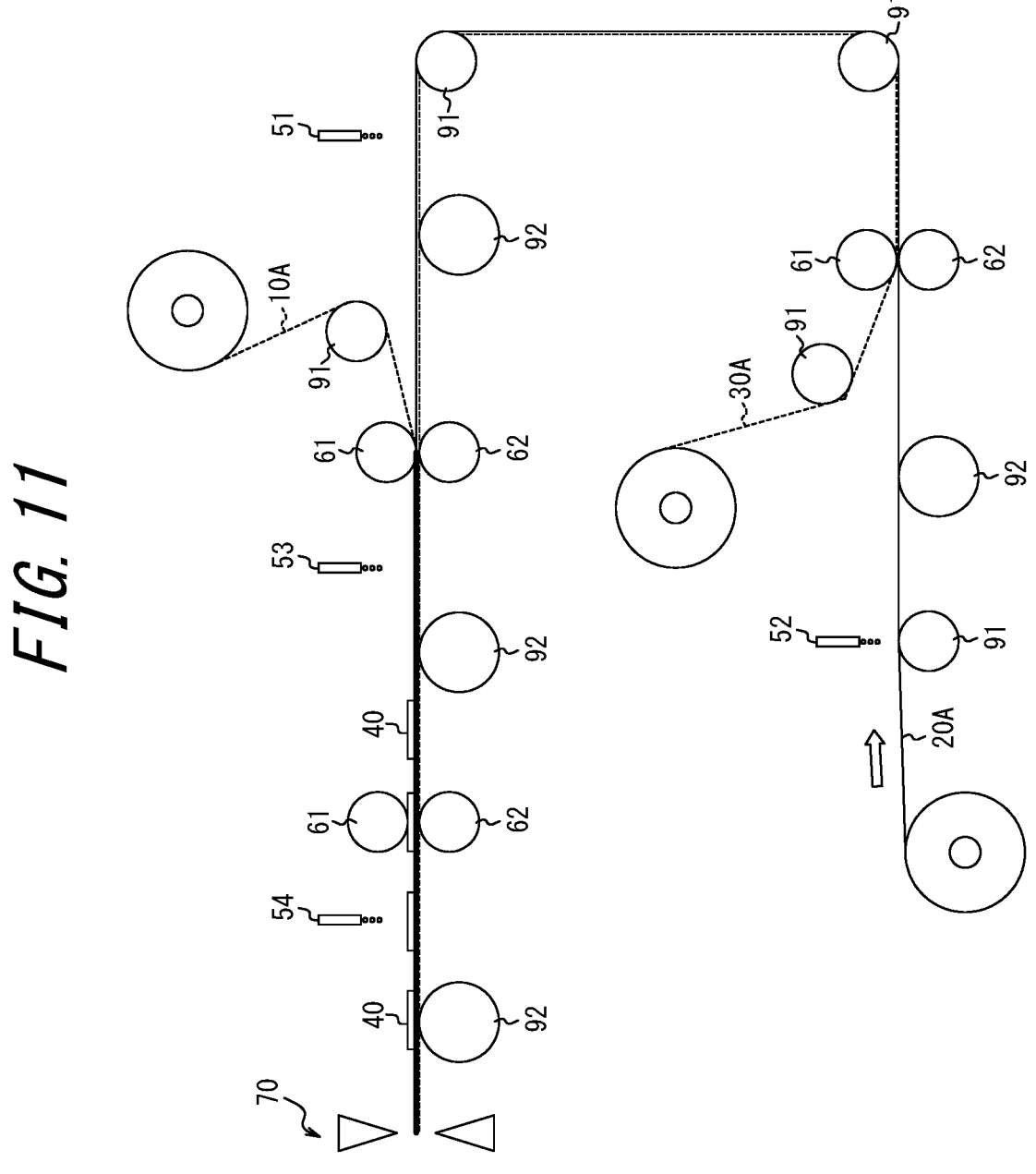
FIG. 11 is an explanatory diagram illustrating a production process of a laminate in examples and comparative examples.

The composition for adhesion, the negative electrode web, the positive electrode web, and the separator web that had been produced were used to produce a laminate as illustrated in FIG. 11. Note that reference sign 91 in FIG. 11 indicates a conveying roller, whereas reference sign 92 in FIG. 11 indicates a heat roller.

Specifically, a negative electrode web 20A fed from a negative electrode web roll was conveyed at a speed of 10 m/min while the composition for adhesion was supplied onto one surface of the negative electrode web 20A from an inkjet head of an inkjet-type coating machine 52 (KM1024 (shear-mode type) produced by Konica) and a second separator web 30A fed from a separator web roll was affixed to the negative electrode web 20A by pressure bonding rollers 61 and 62. The composition for adhesion was also supplied onto the other surface of the negative electrode web 20A from an inkjet head of an inkjet-type coating machine 51 (KM1024 (shear-mode type) produced by Konica), and a first separator web 10A fed from a separator web roll was affixed to the laminate of the negative electrode web 20A and the second separator web 30A by pressure bonding rollers 61 and 62. In addition, the composition for adhesion was supplied onto a surface of the first separator web 10A at the opposite side thereof to the negative electrode web 20A from an inkjet head of an inkjet-type coating machine 53 (KM1024 (shear-mode type) produced by Konica), positive electrodes 40 that had been cut in advance were placed thereon, and the positive electrodes 40 were affixed to the laminate of the first separator web 10A, the negative electrode web 20A, and the second separator web 30A by pressure bonding rollers 61 and 62. Furthermore, the composition for adhesion was supplied onto the positive electrodes 40 from an inkjet head of an inkjet-type coating machine 54 (KM1024 (shear-mode type) produced by Konica), and cutting was subsequently performed by a cutting machine 70 to obtain laminates in which a second separator, a negative electrode, a first separator, and a positive electrode were stacked in stated order.

Note that affixing using the pressure bonding rollers 61 and 62 was performed at a temperature of 70° C. and a pressure of 1 MPa.

Moreover, the supplied composition for adhesion was dried (drying temperature: 70° C.; drying time: 1 s) by using heat rollers 92 as some of the conveying rollers 91.

Supply of the composition for adhesion from the coating machines 51-54 was performed as indicated in Table 2. Specifically, a region having a center at the same position as the center of an affixing surface X or Y of an electrode and a separator, having a similar shape to a shape of the affixing surface X or Y, and having an area equivalent to 10% of the area of the affixing surface X or Y was taken to be a "region S where adhesive material is applied densely" in Table 2 and a region other than the "region S where adhesive material is applied densely" at the affixing surface X or Y was taken to be a "region T where adhesive material is applied sparsely" in Table 2, and the composition for an adhesive layer was applied (supplied) such that the "ratio of coverage of adhesive material" was 3.0% and the "coating weight of adhesive material" was 0.180 g/m² in the "region S where adhesive material is applied densely" and such that the "ratio of coverage of adhesive material" was 0.79% and the "coating weight of adhesive material" was 0.044 g/m² in the "region T where adhesive material is applied sparsely". Note that "adhesive material" in "ratio of coverage of adhesive material" and "coating weight of adhesive material" each refer to material in a state in which solvent has been removed from the composition for adhesion by drying. The previously described composition for adhesion 1 was used as the applied composition for adhesion in both the "region S where adhesive material is applied densely" and the "region T where adhesive material is applied sparsely". Moreover, the composition for adhesion was applied such as to be arranged in a dotted pattern in both the "region S where adhesive material is applied densely" and the "region T where adhesive material is applied sparsely". Upon observation of the dried composition for adhesion (adhesive material that is a dried product) using a laser microscope, adhesive material was arranged in plurality in a fine dotted pattern at an affixing surface. For both the "region S where adhesive material is applied densely" and the "region T where adhesive material is applied sparsely", the dot size of adhesive material arranged in a dotted pattern was 40 μm in diameter.

By performing application as described above, the ratio of coverage E of adhesive material was 3.0% and the coating weight of adhesive material was 0.180 g/m² in a central region P that had a center at the same position as the center of the affixing surface X or Y of the electrode and separator, that had a similar shape to the shape of the affixing surface X or Y, and that had an area equivalent to 10% of the area of the affixing surface X or Y, and the ratio of coverage F of adhesive material was 0.79% and the coating weight of adhesive material was 0.044 g/m² in another region Q that was a region other than the central region P at the affixing surface X or Y.

Adhesive strength of the laminate was evaluated. The result is shown in Table 2.

<Production of Secondary Battery and Measurement of Resistance Per Unit Area>

The produced laminate was enclosed in an aluminum packing case serving as a case, and electrolyte solution (solvent: ethylene carbonate/diethyl carbonate/vinylene carbonate=68.5/30/1.5 (volume ratio); electrolyte: $LiPF_6$ of 1 M in concentration) was injected. An opening of the aluminum packing case was subsequently closed by heat sealing at a temperature of 150° C. to produce a lithium ion secondary battery. The lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C., and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

The lithium ion secondary battery was subsequently charged to an SOC (State of Charge) of 50% and was then disassembled in an inert gas atmosphere. Five electrode groups were randomly punched out from the central region P of the disassembled laminate such as to have an effective area of 1 cm². Each of these electrode groups was enclosed in an aluminum packing case serving as a case once tab leads had been joined thereto, and then the previously described electrolyte solution was injected. In this manner, 5 secondary batteries that were each composed of only the central region P were produced. The produced batteries were each discharged under conditions of a discharge rate of 3 C and a discharge time of 10 s, and an average value for direct current resistance values during this discharging was taken to be the resistance A per unit area of the central region P. Note that the "direct current resistance" referred to herein indicates a resistance value that is calculated by the following formula when the voltage before discharge (0 s) is taken to be V0 and the voltage after 10 s is taken to be V1.

Direct current resistance=1 cm²×(V1−V0)/3C current value

In the same manner, 10 electrode groups were randomly punched out from the region Q other than the central region P of the disassembled laminate such as to have an effective area of 1 cm×1 cm, and secondary batteries composed of only the other region Q were produced by the same method. The produced batteries were discharged under the same conditions as described above, and an average value of direct current resistance values during this discharging was taken to be the resistance B per unit area of the other region Q. A ratio (A/B) of the resistance values is shown in Table 2.

In addition, 5 laminates that were produced as previously described were stacked and were pressed at a temperature of 70° C. and a pressure of 1 MPa for 10 seconds to produce a stack. The produced stack was enclosed in an aluminum packing case serving as a case, and electrolyte solution (solvent: ethylene carbonate/diethyl carbonate/vinylene carbonate=68.5/30/1.5 (volume ratio); electrolyte: $LiPF_6$ of 1 M in concentration) was injected. An opening of the aluminum packing case was subsequently closed by heat sealing at a temperature of 150° C. to produce a stacked lithium ion secondary battery having a capacity of 800 mAh. The cycle characteristics and output characteristics of the obtained secondary battery were evaluated. The results are shown in Table 2.

Example 2

A composition for adhesion, a negative electrode web, a positive electrode web, a separator web, a laminate, and a secondary battery were produced and prepared in the same way as in Example 1 with the exception that, in production of the laminate in Example 1, the area of the "region S where adhesive material is applied densely" was changed from 10% to 20% of the area of the affixing surface X or Y, and the area of the "region T where adhesive material is applied sparsely" was changed from 90% to 80% of the area of the affixing surface X or Y.

Various measurements and evaluations were performed in the same way as in Example 1. The results are shown in Table 2.

Note that as a result of the areas of the "region S where adhesive material is applied densely" and the "region T where adhesive material is applied sparsely" changing as described above, the ratio of coverage E of adhesive material remained as 3.0% and the coating weight of adhesive material remained as 0.180 g/m² in the central region P because the central region P only includes the "region S where adhesive material is applied densely", whereas the ratio of coverage F of adhesive material changed to 1.04% and the coating weight of adhesive material changed to 0.059 g/m² in the other region Q because a section corresponding to the "region S where adhesive material is applied densely" and a section corresponding to the "region T where adhesive material is applied sparsely" are both present in the other region Q. Note that in a case in which a section corresponding to the "region S where adhesive material is applied densely" and a section corresponding to the "region T where adhesive material is applied sparsely" are both present in the other region Q, the ratio of coverage F and coating weight of adhesive material in the other region Q can be determined by the following formulae.

Ratio of coverage F=(Ratio of coverage of adhesive material in region S where adhesive material is applied densely)×(Proportion occupied by region S where adhesive material is applied densely in other region Q)+(Ratio of coverage of adhesive material in region T where adhesive material is applied sparsely)×(Proportion occupied by region T where adhesive material is applied sparsely in other region Q)

Coating weight=(Coating weight of adhesive material in region S where adhesive material is applied densely)×(Proportion occupied by region S where adhesive material is applied densely in other region Q)+(Coating weight of adhesive material in region T where adhesive material is applied sparsely)×(Proportion occupied by region T where adhesive material is applied sparsely in other region Q)

Example 3

In production of the laminate in Example 1, the distance (pitch) between centers of the composition for adhesion supplied in a dotted form in the "region S where adhesive material is applied densely" and the "region T where adhesive material is applied sparsely" was adjusted so as to change the dot size of the composition for adhesion supplied in a dotted form from 40 μm in diameter to 80 μm in diameter without changing the ratio of coverage of adhesive material in each of the "region S where adhesive material is applied densely" and the "region T where adhesive material is applied sparsely". As a result, the coating weight of adhesive material in the "region S where adhesive material is applied densely" was 0.124 g/m² and the coating weight of adhesive material in the "region T where adhesive material is applied sparsely" was 0.031 g/m². Thereafter, a composition for adhesion, a negative electrode web, a positive electrode web, a separator web, a laminate, and a secondary battery were produced and prepared in the same way as in Example 1.

Various measurements and evaluations were performed in the same way as in Example 1. The results are shown in Table 2.

Example 4

In production of the laminate in Example 1, the distance (pitch) between centers of the composition for adhesion supplied in a dotted form in the "region S where adhesive material is applied densely" and the "region T where adhesive material is applied sparsely" was adjusted so as to change the dot size of the composition for adhesion supplied in a dotted form from 40 μm in diameter to 20 μm in diameter without changing the ratio of coverage of adhesive material in each of the "region S where adhesive material is applied densely" and the "region T where adhesive material is applied sparsely". As a result, the coating weight of adhesive material in the "region S where adhesive material is applied densely" was 0.158 g/m$^2$ and the coating weight of adhesive material in the "region T where adhesive material is applied sparsely" was 0.040 g/m$^2$. Thereafter, a composition for adhesion, a negative electrode web, a positive electrode web, a separator web, a laminate, and a secondary battery were produced and prepared in the same way as in Example 1.

Various measurements and evaluations were performed in the same way as in Example 1. The results are shown in Table 2.

Example 5

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region T where adhesive material is applied sparsely" was adjusted so as to change the ratio of coverage of adhesive material from 0.79% to 0.35% and change the coating weight of adhesive material from 0.044 g/m$^2$ to 0.022 g/m$^2$ in the "region T where adhesive material is applied sparsely".

Various measurements and evaluations were performed in the same way as in Example 1. The results are shown in Table 2.

Example 6

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region T where adhesive material is applied sparsely" was adjusted so as to change the ratio of coverage of adhesive material from 0.79% to 0.20% and change the coating weight of adhesive material from 0.044 g/m$^2$ to 0.011 g/m$^2$ in the "region T where adhesive material is applied sparsely".

Various measurements and evaluations were performed in the same way as in Example 1. The results are shown in Table 2.

Example 7

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region T where adhesive material is applied sparsely" was adjusted so as to change the ratio of coverage of adhesive material from 0.79% to 1.40% and change the coating weight of adhesive material from 0.044 g/m$^2$ to 0.079 g/m$^2$ in the "region T where adhesive material is applied sparsely".

Various measurements and evaluations were performed in the same way as in Example 1. The results are shown in Table 2.

Example 8

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region S where adhesive material is applied densely" was adjusted so as to change the ratio of coverage of adhesive material from 3.00% to 5.60% and change the coating weight of adhesive material from 0.180 g/m$^2$ to 0.316 g/m$^2$ in the "region S where adhesive material is applied densely".

Various measurements and evaluations were performed in the same way as in Example 1. The results are shown in Table 2.

Example 9

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region S where adhesive material is applied densely" was adjusted so as to change the ratio of coverage of adhesive material from 3.00% to 12.57% and change the coating weight of adhesive material from 0.180 g/m$^2$ to 0.712 g/m$^2$ in the "region S where adhesive material is applied densely".

Various measurements and evaluations were performed in the same way as in Example 1. The results are shown in Table 2.

Example 10

A composition for adhesion, a negative electrode web, a positive electrode web, a separator web, a laminate, and a secondary battery were produced and prepared in the same way as in Example 1 with the exception that, in production of the laminate in Example 1, the distance (pitch) between centers of the composition for adhesion supplied in a dotted form in the "region S where adhesive material is applied densely" was adjusted so as to change the ratio of coverage of adhesive material from 3.00% to 1.40% and change the coating weight of adhesive material from 0.180 g/m² to 0.079 g/m² in the "region S where adhesive material is applied densely".

Various measurements and evaluations were performed in the same way as in Example 1. The results are shown in Table 2.

Example 11

A composition for adhesion, a negative electrode web, a positive electrode web, a separator web, a laminate, and a secondary battery were produced and prepared in the same way as in Example 1 with the exception that, in production of the laminate in Example 1, the supply form of the composition for adhesion in the "region S where adhesive material is applied densely" and the "region T where adhesive material is applied sparsely" was changed from a dotted form to a striped form, the ratio of coverage of adhesive material was changed from 3.00% to 9.09% and the coating weight of adhesive material was changed from 0.180 g/m² to 0.400 g/m² in the "region S where adhesive material is applied densely", and the ratio of coverage of adhesive material was changed from 0.79% to 3.61% and the coating weight of adhesive material was changed from 0.044 g/m² to 0.100 g/m² in the "region T where adhesive material is applied sparsely".

Various measurements and evaluations were performed in the same way as in Example 1. The results are shown in Table 2.

Example 12

A composition for adhesion, a negative electrode web, a positive electrode web, a separator web, a laminate, and a secondary battery were produced and prepared in the same way as in Example 1 with the exception that, in production of the laminate in Example 1, the composition for adhesion applied in the "region S where adhesive material is applied densely" and the "region T where adhesive material is applied sparsely" was changed from the composition for adhesion 1 that was produced in Example 1 to a composition for adhesion 4 that was produced as described below.

Various measurements and evaluations were performed in the same way as in Example 1. The results are shown in Table 2.

<Production of Composition for Adhesion 4>

After adding 5 parts of sodium dodecylbenzenesulfonate to 100 parts of deionized water and stirring these materials using a disper blade, 10 parts of a powder of vinylidene fluoride-hexafluoropropylene copolymer (PVdF-HFP; LBG produced by Arkema) was gradually added and was stirred therewith for 2 hours to yield a water dispersion having a solid content concentration of PVdF-HFP of 10.5%. Propylene glycol was further added to the obtained water dispersion to adjust the solid content concentration to 10%, and thereby yield a composition for adhesion 4.

Example 13

A composition for adhesion, a negative electrode web, a positive electrode web, a separator web, a laminate, and a secondary battery were produced and prepared in the same way as in Example 1 with the exception that, in production of the laminate in Example 1, the area of the "region S where adhesive material is applied densely" was changed from 10% to 50% of the area of the affixing surface X or Y, and the area of the "region T where adhesive material is applied sparsely" was changed from 90% to 50% of the area of the affixing surface X or Y.

Various measurements and evaluations were performed in the same way as in Example 1. The results are shown in Table 2.

Note that as a result of the areas of the "region S where adhesive material is applied densely" and the "region T where adhesive material is applied sparsely" changing as described above, the ratio of coverage E of adhesive material remained as 3.0% and the coating weight of adhesive material remained as 0.180 g/m² in the central region P because the central region P only includes the "region S where adhesive material is applied densely", whereas the ratio of coverage F of adhesive material changed to 1.77% and the coating weight of adhesive material changed to 0.104 g/m² in the other region Q because a section corresponding to the "region S where adhesive material is applied densely" and a section corresponding to the "region T where adhesive material is applied sparsely" are both present in the other region Q.

Example 14

A composition for adhesion, a negative electrode web, a positive electrode web, a separator web, a laminate, and a secondary battery were produced and prepared in the same way as in Example 1 with the exception that, in production of the laminate in Example 1, an "application region S1" was set instead of the "region S where adhesive material is applied densely" and a composition for adhesion 2 produced as described below was applied in the "application region S1" such that the ratio of coverage of adhesive material was 3.00% and the coating weight of adhesive material was 0.180 g/m², and a region other than the "region S where adhesive material is applied densely" at the affixing surface X or Y was set as an "application region S2" instead of the "region T where adhesive material is applied sparsely" and the composition for adhesion 1 was applied in the "application region S2" such that the ratio of coverage of adhesive material was 3.00% and the coating weight of adhesive material was 0.180 g/m².

Various measurements and evaluations were performed in the same way as in Example 1. The results are shown in Table 3.

<Production of Composition for Adhesive Layer 2>

A composition for adhesion 2 was obtained in the same way as in Example 1 with the exception that, in production of the composition for an adhesive layer in Example 1, the water dispersion of the particulate polymer 2 having a core-shell structure that was obtained in Production Example 2 was used instead of the water dispersion of the particulate polymer 1 having a core-shell structure that was obtained in Production Example 1.

Example 15

A composition for adhesion, a negative electrode web, a positive electrode web, a separator web, a laminate, and a secondary battery were produced and prepared in the same way as in Example 1 with the exception that, in production of the laminate in Example 1, an "application region S1" was set instead of the "region S where adhesive material is applied densely" and a composition for adhesion 3 produced as described below was applied in the "application region S1" such that the ratio of coverage of adhesive material was 3.00% and the coating weight of adhesive material was 0.180 g/m², and a region other than the "region S where adhesive material is applied densely" at the affixing surface X or Y was set as an "application region S2" instead of the "region T where adhesive material is applied sparsely" and the composition for adhesion 1 was applied in the "application region S2" such that the ratio of coverage of adhesive material was 3.00% and the coating weight of adhesive material was 0.180 g/m².

Various measurements and evaluations were performed in the same way as in Example 1. The results are shown in Table 3.

<Production of Composition for Adhesive Layer 3>

A composition for adhesion 3 was obtained in the same way as in Example 1 with the exception that, in production of the composition for an adhesive layer in Example 1, the water dispersion of the particulate polymer 3 not having a core-shell structure that was obtained in Production Example 3 was used instead of the water dispersion of the particulate polymer 1 having a core-shell structure that was obtained in Production Example 1.

Example 16

A composition for adhesion, a negative electrode web, a positive electrode web, a separator web, a laminate, and a secondary battery were produced and prepared in the same way as in Example 1 with the exception that, in production of the laminate in Example 1, the composition for adhesion that was applied in the "region S where adhesive material is applied densely" and the "region T where adhesive material is applied sparsely" was changed from the composition for adhesion 1 that was produced in Example 1 to a composition for adhesion 5 that was produced as described below.

Various measurements and evaluations were performed in the same way as in Example 1. The results are shown in Table 4.

<Production of Composition for Adhesive Layer 5>

A composition for adhesion 5 was obtained in the same way as in Example 1 with the exception that, in production of the composition for an adhesive layer in Example 1, the water dispersion of the particulate polymer 5 having a core-shell structure that was obtained in Production Example 5 was used instead of the water dispersion of the particulate polymer 1 having a core-shell structure that was obtained in Production Example 1.

Example 17

A composition for adhesion, a negative electrode web, a positive electrode web, a separator web, a laminate, and a secondary battery were produced and prepared in the same way as in Example 1 with the exception that, in production of the laminate in Example 1, the composition for adhesion that was applied in the "region S where adhesive material is applied densely" and the "region T where adhesive material is applied sparsely" was changed from the composition for adhesion 1 that was produced in Example 1 to a composition for adhesion 6 that was produced as described below.

Various measurements and evaluations were performed in the same way as in Example 1. The results are shown in Table 4.

<Production of Composition for Adhesive Layer 6>

A composition for adhesion 6 was obtained in the same way as in Example 1 with the exception that, in production of the composition for an adhesive layer in Example 1, the water dispersion of the particulate polymer 6 having a core-shell structure that was obtained in Production Example 6 was used instead of the water dispersion of the particulate polymer 1 having a core-shell structure that was obtained in Production Example 1.

Comparative Example 1

An adhesive material, a composition for adhesion, a negative electrode web, a positive electrode web, a separator web, a laminate, and a secondary battery were produced and prepared in the same way as in Example 1 with the exception that gravure coaters were used instead of inkjet-type coating machines as the coating machines 51-54, and the composition for adhesion 1 was applied over the entirety of an affixing surface such that the ratio of coverage of adhesive material was 90% and the coating weight of adhesive material was 0.220 g/m² for the entire affixing surface X or Y.

Various evaluations were performed in the same way as in Example 1. The results are shown in Table 2.

Comparative Example 2

A composition for adhesion, a negative electrode web, a positive electrode web, a separator web, a laminate, and a secondary battery were produced and prepared in the same way as in Example 1 with the exception that, in production of the laminate in Example 1, the area of the "region S where adhesive material is applied densely" was changed from 10% to 100% of the area of the affixing surface X or Y, and the area of the "region T where adhesive material is applied sparsely" was changed from 90% to 0% of the area of the affixing surface X or Y.

Various measurements and evaluations were performed in the same way as in Example 1. The results are shown in Table 2.

Comparative Example 3

A composition for adhesion, a negative electrode web, a positive electrode web, a separator web, a laminate, and a secondary battery were produced and prepared in the same way as in Example 1 with the exception that, in production of the laminate in Example 1, the area of the "region S where adhesive material is applied densely" was changed from 10% to 0% of the area of the affixing surface X or Y, and the area of the "region T where adhesive material is applied sparsely" was changed from 90% to 100% of the area of the affixing surface X or Y.

Various measurements and evaluations were performed in the same way as in Example 1. The results are shown in Table 2.

In Tables 1 to 4:
"MMA" indicates methyl methacrylate;
"BA" indicates butyl acrylate;
"2EHA" indicates 2-ethylhexyl acrylate;
"AN" indicates acrylonitrile;
"St" indicates styrene;
"MAA" indicates methacrylic acid;
"AA" indicates acrylic acid;
"AGE" indicates allyl glycidyl ether;
"AMA" indicates allyl methacrylate; and
"EDMA" indicates ethylene glycol dimethacrylate.
Moreover, in Table 2:
"PVdF-HFP" indicates vinylidene fluoride-hexafluoro-propylene copolymer.

TABLE 1

| | | | Production Example 1 | Production Example 2 | Production Example 3 | Production Example 4 | Production Example 5 | Production Example 6 |
|---|---|---|---|---|---|---|---|---|
| Type of particulate polymer | | | Particulate polymer 1 | Particulate polymer 2 | Particulate polymer 3 | Particulate polymer 4 | Particulate polymer 5 | Particulate polymer 6 |
| Chemical composition [mass %] | Core portion | MMA | — | 17 | — | — | — | — |
| | | BA | — | 36.1 | — | — | — | — |
| | | 2EHA | 27.3 | — | 39 | 70 | 47.6 | 47.6 |
| | | AN | — | 14 | — | — | — | — |
| | | St | 40.3 | — | 57.6 | 25 | 20.2 | 20.2 |
| | | MAA | 2.1 | 2.8 | 3 | — | 2.1 | 2.1 |
| | | AA | — | — | — | 3 | — | — |
| | | AGE | — | — | — | 1.7 | — | — |
| | | AMA | — | — | — | 0.3 | — | — |
| | | EDMA | 0.3 | 0.1 | 0.4 | — | 0.1 | 0.1 |
| | Shell portion | St | 29.7 | 29.7 | | | 29.7 | 29.7 |
| | | MAA | 0.3 | 0.3 | | | 0.3 | 0.3 |
| Mass ratio (core portion/shell portion) | | | 7/3 | 7/3 | — | — | 7/3 | 7/3 |
| Glass-transition temperature [° C.] | Core portion | | 35 | 35 | 35 | −25 | −18 | −18 |
| | Shell portion | | 105 | 105 | | | 105 | 105 |
| Volume-average particle diameter D50 [nm] | | | 700 | 680 | 650 | 200 | 700 | 300 |
| Degree of swelling [%] | | | 170 | 1200 | 170 | 170 | 170 | 170 |

TABLE 2

| | | | | Example 1 | Example 2 | Example 3 | Example 4 | Example 5 | Example 6 | Example 7 | Example 8 |
|---|---|---|---|---|---|---|---|---|---|---|---|
| Application conditions | Application method | | | Inkjet | Inkjet | Inkjet | Inkjet | Inkjet | Inkjet | Inkjet | Inkjet |
| | Application pattern | | | Dot | Dot | Dot | Dot | Dot | Dot | Dot | Dot |
| | Region S where adhesive material is applied densely | Composition for adhesion | Type | Composition for adhesion 1 | Composition for adhesion 1 | Composition for adhesion 1 | Composition for adhesion 1 | Composition for adhesion 1 | Composition for adhesion 1 | Composition for adhesion 1 | Composition for adhesion 1 |
| | | | Chemical composition | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 |
| | | Proportion of area occupied at surface Z [%] | | 10 | 20 | 10 | 10 | 10 | 10 | 10 | 10 |
| | | Coating weight of adhesive material [g/m²] | | 0.180 | 0.180 | 0.124 | 0.158 | 0.180 | 0.180 | 0.180 | 0.316 |
| | | Dot size (diameter) or stripe width [μm] | | 40 | 40 | 80 | 20 | 40 | 40 | 40 | 40 |
| | | Ratio of coverage of adhesive material [%] | | 3.00 | 3.00 | 3.00 | 3.00 | 3.00 | 3.00 | 3.00 | 5.60 |
| | Region T where adhesive material is applied sparsely | Composition for adhesion | Type | Composition for adhesion 1 | Composition for adhesion 1 | Composition for adhesion 1 | Composition for adhesion 1 | Composition for adhesion 1 | Composition for adhesion 1 | Composition for adhesion 1 | Composition for adhesion 1 |
| | | | Chemical composition | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 | Particulate polymer 1 + particulate polymer 4 |
| | | Proportion of area occupied at surface Z [%] | | 90 | 80 | 90 | 90 | 90 | 90 | 90 | 90 |
| | | Coating weight of adhesive material [g/m²] | | 0.044 | 0.044 | 0.031 | 0.040 | 0.022 | 0.011 | 0.079 | 0.044 |

TABLE 2-continued

| | | | | | | | | | |
|---|---|---|---|---|---|---|---|---|---|
| | Dot size (diameter) or stripe width [μm] | 40 | 40 | 80 | 20 | 40 | 40 | 40 | 40 |
| | Ratio of coverage of adhesive material [%] | 0.79 | 0.79 | 0.79 | 0.79 | 0.35 | 0.20 | 1.40 | 0.79 |
| Central region P | Ratio of coverage E of adhesive material [%] | 3.00 | 3.00 | 3.00 | 3.00 | 3.00 | 3.00 | 3.00 | 5.60 |
| | Coating weight of adhesive material [g/m²] | 0.180 | 0.180 | 0.124 | 0.158 | 0.180 | 0.180 | 0.180 | 0.316 |
| Other region Q | Ratio of coverage F of adhesive material [%] | 0.79 | 1.04 | 0.79 | 0.79 | 0.35 | 0.20 | 1.40 | 0.79 |
| | Coating weight of adhesive material [g/m²] | 0.044 | 0.059 | 0.031 | 0.040 | 0.022 | 0.011 | 0.079 | 0.044 |
| Ratio (E/F) of ratios of coverage of adhesive material | | 3.80 | 2.88 | 3.80 | 3.80 | 8.57 | 15.00 | 2.14 | 7.09 |
| Ratio (A/B) of resistance A per unit area of central region P and resistance B per unit area of other region Q | | 1.02 | 1.015 | 1.02 | 1.02 | 1.15 | 1.24 | 1.007 | 1.20 |
| Evaluation | Adhesive strength | A | A | A | A | B | C | A | A |
| | Cycle characteristics | A | A | A | A | A | A | B | A |
| | Output characteristics | A | A | A | A | A | A | B | A |

| | | | Example 9 | Example 10 | Example 11 | Example 12 | Example 13 | Comparative Example 1 | Comparative Example 2 | Comparative Example 3 |
|---|---|---|---|---|---|---|---|---|---|---|
| Application conditions | Application method | | Inkjet | Inkjet | Inkjet | Inkjet | Inkjet | Gravure coater | Inkjet | Inkjet |
| | Application pattern | | Dot | Dot | Stripe | Dot | Dot | Entire surface | Dot | Dot |
| | Region S where adhesive material is applied densely | Composition for adhesion / Type | Composition for adhesion 1 | Composition for adhesion 1 | Composition for adhesion 1 | Composition for adhesion 4 | Composition for adhesion 1 | Composition for adhesion 1 | Composition for adhesion 1 | — |
| | | Chemical composition | Particulate polymer 1 + particulate polymer 4 | Particulate polymer 1 + particulate polymer 4 | Particulate polymer 1 + particulate polymer 4 | PVdF-HFP | Particulate polymer 1 + particulate polymer 4 | Particulate polymer 1 + particulate polymer 4 | Particulate polymer 1 + particulate polymer 4 | |
| | | Proportion of area occupied at surface Z [%] | 10 | 10 | 10 | 10 | 50 | 100 | 100 | |
| | | Coating weight of adhesive material [g/m²] | 0.712 | 0.079 | 0.400 | 0.180 | 0.180 | 0.220 | 0.180 | |
| | | Dot size (diameter) or stripe width [μm] | 40 | 40 | 30 | 40 | 40 | — | 40 | |
| | | Ratio of coverage of adhesive material [%] | 12.57 | 1.40 | 9.09 | 3.00 | 3.00 | 90.00 | 3.00 | |
| | Region T where adhesive material is applied sparsely | Composition for adhesion / Type | Composition for adhesion 1 | Composition for adhesion 1 | Composition for adhesion 1 | Composition for adhesion 4 | Composition for adhesion 1 | — | — | Composition for adhesion 1 |
| | | Chemical composition | Particulate polymer 1 + particulate polymer 4 | Particulate polymer 1 + particulate polymer 4 | Particulate polymer 1 + particulate polymer 4 | PVdF-HFP | Particulate polymer 1 + particulate polymer 4 | | | Particulate polymer 1 + particulate polymer 4 |
| | | Proportion of area occupied at surface Z [%] | 90 | 90 | 90 | 90 | 50 | | | 100 |
| | | Coating weight of adhesive material [g/m²] | 0.044 | 0.044 | 0.10 | 0.044 | 0.044 | | | 0.044 |

TABLE 2-continued

|  |  |  |  |  |  |  |  |  |  |
|---|---|---|---|---|---|---|---|---|---|
|  | Dot size (diameter) or stripe width [μm] | 40 | 40 | 30 | 40 | 40 |  |  | 40 |
|  | Ratio of coverage of adhesive material [%] | 0.79 | 0.79 | 3.61 | 0.79 | 0.79 |  |  | 0.79 |
| Central region P | Ratio of coverage E of adhesive material [%] | 12.57 | 1.40 | 9.09 | 3.00 | 3.00 | 90.00 | 3.00 | 0.79 |
|  | Coating weight of adhesive material [g/m²] | 0.712 | 0.079 | 0.400 | 0.180 | 0.180 | 0.220 | 0.180 | 0.044 |
| Other region Q | Ratio of coverage F of adhesive material [%] | 0.79 | 0.79 | 3.61 | 0.79 | 1.77 | 90.00 | 3.00 | 0.79 |
|  | Coating weight of adhesive material [g/m²] | 0.044 | 0.044 | 0.100 | 0.044 | 0.104 | 0.220 | 0.180 | 0.044 |
| Ratio (E/F) of ratios of coverage of adhesive material |  | 15.91 | 1.77 | 2.52 | 3.80 | 1.69 | 1.00 | 1.00 | 1.00 |
| Ratio (A/B) of resistance A per unit area of central region P and resistance B per unit area of other region Q |  | 1.50 | 1.003 | 1.080 | 1.02 | 1.003 | 1.000 | 1.000 | 1.000 |
| Evaluation | Adhesive strength | A | A | A | A | A | A | A | A |
|  | Cycle characteristics | A | C | B | A | C | D | D | D |
|  | Output characteristics | B | A | B | A | C | D | C | A |

TABLE 3

|  |  |  |  | Example 14 | Example 15 |
|---|---|---|---|---|---|
| Application conditions |  | Application method |  | Inkjet | Inkjet |
|  |  | Application pattern |  | Dot | Dot |
|  | Application region S1 | Composition for adhesion | Type | Composition for adhesion 2 | Composition for adhesion 3 |
|  |  |  | Chemical composition | Particulate polymer 2 + particulate polymer 4 | Particulate polymer 3 + particulate polymer 4 |
|  |  | Proportion of area occupied at surface Z [%] |  | 10 | 10 |
|  |  | Coating weight of adhesive material [g/m²] |  | 0.180 | 0.180 |
|  |  | Dot size (diameter) or stripe width [μm] |  | 40 | 40 |
|  |  | Ratio of coverage of adhesive material [%] |  | 3.00 | 3.00 |
|  | Application region S2 | Composition for adhesion | Type | Composition for adhesion 1 | Composition for adhesion 1 |
|  |  |  | Chemical composition | Particulate polymer 1 + particulate polymer 4 | Particulate polymer 1 + particulate polymer 4 |
|  |  | Proportion of area occupied at surface Z [%] |  | 90 | 90 |
|  |  | Coating weight of adhesive material [g/m²] |  | 0.18 | 0.18 |
|  |  | Dot size (diameter) or stripe width [μm] |  | 40 | 40 |
|  |  | Ratio of coverage of adhesive material [%] |  | 3.00 | 3.00 |
| Central region P | Ratio of coverage E of adhesive material [%] |  |  | 3.00 | 3.00 |
|  | Coating weight of adhesive material [g/m²] |  |  | 0.180 | 0.180 |
| Other region Q | Ratio of coverage F of adhesive material [%] |  |  | 3.00 | 3.00 |
|  | Coating weight of adhesive material [g/m²] |  |  | 0.180 | 0.180 |
| Ratio (E/F) of ratios of coverage of adhesive material |  |  |  | 1.00 | 1.00 |
| Ratio (A/B) of resistance A per unit area of central region P and resistance B per unit area of other region Q |  |  |  | 1.070 | 1.070 |
| Evaluation | Adhesive strength |  |  | A | A |
|  | Cycle characteristics |  |  | A | A |
|  | Output characteristics |  |  | A | B |

TABLE 4

| | | | | Example 16 | Example 17 |
|---|---|---|---|---|---|
| Application conditions | | | Application method | Inkjet | Inkjet |
| | | | Application pattern | Dot | Dot |
| | Region S where adhesive material is applied densely | Composition for adhesion | Type | Composition for adhesion 5 | Composition for adhesion 6 |
| | | | Chemical composition | Particulate polymer 5 + particulate polymer 4 | Particulate polymer 6 + particulate polymer 4 |
| | | Proportion of area occupied at surface Z [%] | | 10 | 10 |
| | | Coating weight of adhesive material [g/m$^2$] | | 0.180 | 0.180 |
| | | Dot size (diameter) or stripe width [μm] | | 40 | 40 |
| | | Ratio of coverage of adhesive material [%] | | 3.00 | 3.00 |
| | Region T where adhesive material is applied sparsely | Composition for adhesion | Type | Composition for adhesion 5 | Composition for adhesion 6 |
| | | | Chemical composition | Particulate polymer 5 + particulate polymer 4 | Particulate polymer 6 + particulate polymer 4 |
| | | Proportion of area occupied at surface Z [%] | | 90 | 90 |
| | | Coating weight of adhesive material [g/m$^2$] | | 0.04 | 0.04 |
| | | Dot size (diameter) or stripe width [μm] | | 40 | 40 |
| | | Ratio of coverage of adhesive material [%] | | 0.79 | 0.79 |
| Central region P | Ratio of coverage E of adhesive material [%] | | | 3.00 | 3.00 |
| | Coating weight of adhesive material [g/m$^2$] | | | 0.180 | 0.180 |
| Other region Q | Ratio of coverage F of adhesive material [%] | | | 0.79 | 0.79 |
| | Coating weight of adhesive material [g/m$^2$] | | | 0.044 | 0.044 |
| | Ratio (E/F) of ratios of coverage of adhesive material | | | 3.80 | 3.80 |
| | Ratio (A/B) of resistance A per unit area of central region P and resistance B per unit area of other region Q | | | 1.020 | 1.020 |
| Evaluation | Adhesive strength | | | A | A |
| | Cycle characteristics | | | A | A |
| | Output characteristics | | | A | A |

It can be seen from Tables 2, 3, and 4 that cycle characteristics are excellent for the secondary batteries of Examples 1 to 17 that are each a secondary battery including a laminate in which a positive electrode, a separator, and a negative electrode are stacked in stated order and in each of which the resistance A per unit area of a central region P that has a similar shape to a shape of a surface Z that is either or both of an affixing surface X of the positive electrode and the separator and an affixing surface Y of the negative electrode and the separator, that has a center at the same position as a center of the surface Z, and that has an area equivalent to 10% of the area of the surface Z is larger than the resistance B per unit area of a region Q other than the central region P at the surface Z.

On the other hand, it can be seen that secondary battery cycle characteristics are poor in Comparative Examples 1 to 3 in which the resistance A per unit area of the above-described central region P is not larger than the resistance B per unit area of the region Q other than the central region P at the surface Z.

INDUSTRIAL APPLICABILITY

According to the present disclosure, it is possible to provide a secondary battery having excellent cycle characteristics.

REFERENCE SIGNS LIST 10 first separator
10A first separator web
20 negative electrode
20A negative electrode web
21 negative electrode current collector
22, 23 negative electrode mixed material layer
24 first edge
25 second edge
26 third edge
27 fourth edge
30 second separator
30A second separator web
40 positive electrode
41 positive electrode current collector
42, 43 positive electrode mixed material layer
50 droplet
51-54 coating machine (nozzle head)
55 nozzle
60 substrate
61, 62 pressure bonding roller
70 cutting machine
91 conveying roller
92 heat roller
Z surface
R center
P central region
Q other region
r dot radius
x, y distance between centers of dots
l line width of application sections
s spacing of application sections (line width of non-application sections)
S region where adhesive material is applied densely
T1 region where adhesive material is applied sparsely
T2 region where adhesive material is applied more sparsely
T3 region where adhesive material is applied even more sparsely
100, 100A laminate
200 stack
300 particulate polymer

310 core portion

310S outer surface of core portion

320 shell portion

The invention claimed is:

1. A secondary battery comprising a laminate in which a positive electrode, a separator, and a negative electrode are stacked in stated order, wherein an affixing surface of the positive electrode and the separator is called X and an affixing surface of the negative electrode and the separator is called Y, and that either or both of X and Y is called surface Z, a region that has a similar shape to a shape of a surface Z that has a center at the same position as a center of the surface Z, and that has an area equivalent to 10% of area of the surface Z is called a central region P, a region other than the central region P is called a region Q, a direct current resistance per unit area of the central region P is called as resistance A and a direct current resistance per unit area of the region Q at the surface Z is called resistance B, the resistance A is larger than the resistance B, an adhesive material is present at the surface Z, in the surface Z, either of the following conditions (i) or (ii) is satisfied, (i) a ratio of coverage E of the adhesive material in the central region P of the surface Z is larger than a ratio of coverage F of the adhesive material in the region Q other than the central region P of the surface Z, or (ii) the adhesive material, containing particulate polymers, contained in the central region P and the adhesive material in the region Q are different with each other, wherein in the condition (i), the adhesive material is arranged in a dotted pattern or a striped pattern, in the case of the dotted pattern, the ratio of coverage is adjustable by altering the radius and the distance between centers of dots of the adhesive material, while in the case of the striped pattern, the ratio of coverage is adjustable by altering a line width of application sections for the adhesive material and spacing of the application sections, in the condition (ii), a degree of swelling in electrolyte solution of the particulate polymers contained in the adhesive material that is applied in the central region P is larger than that of the particulate polymers contained in the adhesive material contained in the region Q; or at least a part of the particulate polymers contained in the region Q have the core-shell structure including a core portion and a shell portion partially covering an outer surface of the core portion, while the particulate polymers contained in the adhesive material that is applied in the central region P do not have the core-shell structure.

2. The secondary battery according to claim 1, wherein the ratio of coverage E is not less than 1.1% and not more than 30%.

3. The secondary battery according to claim 1, wherein the ratio of coverage F is not less than 0.3% and less than 0.4×E %.

4. The secondary battery according to claim 1, wherein an adhesive material is present at the surface Z, and a ratio of coverage of the adhesive material at the surface Z decreases gradually from the center of the surface Z toward a periphery of the surface Z.

5. A method of producing a secondary battery including a laminate in which a positive electrode, a separator, and a negative electrode are stacked in stated order, comprising a step of applying an adhesive material at a surface Z that is either or both of an affixing surface X of the positive electrode and the separator and an affixing surface Y of the negative electrode and the separator, wherein an affixing surface of the positive electrode and the separator is called X and an affixing surface of the negative electrode and the separator is called Y, and that either or both of X and Y is called surface Z, a region that has a similar shape to a shape of a surface Z that has a center at the same position as a center of the surface Z, and that has an area equivalent to 10% of area of the surface Z is called a central region P, a region other than the central region P is called a region Q, a direct current resistance per unit area of the central region P is called as resistance A and a direct current resistance per unit area of the region Q at the surface Z is called resistance B, the resistance A is larger than the resistance B, an adhesive material is present at the surface Z, in the surface Z, either of the following conditions (i) or (ii) is satisfied, (i) a ratio of coverage E of the adhesive material in the central region P of the surface Z is larger than a ratio of coverage F of the adhesive material in the region Q other than the central region P of the surface Z, or (ii) the adhesive material, containing particulate polymers, contained in the central region P and the adhesive material in the region Q are different with each other, wherein in the condition (i), the adhesive material is arranged in a dotted pattern or a striped pattern, in the case of the dotted pattern, the ratio of coverage is adjustable by altering the radius and the distance between centers of dots of the adhesive material, while in the case of the striped pattern, the ratio of coverage is adjustable by altering a line width of application sections for the adhesive material and spacing of the application sections, in the condition (ii), a degree of swelling in electrolyte solution of the particulate polymers contained in the adhesive material that is applied in the central region P is larger than that of the particulate polymers contained in the adhesive material contained in the region Q; or at least a part of the particulate polymers contained in the region Q have the core-shell structure including a core portion and a shell portion partially covering an outer surface of the core portion, while the particulate polymers contained in the adhesive material that is applied in the central region P do not have the core-shell structure.

6. The method of producing a secondary battery according to claim 5, wherein the ratio of coverage E is not less than 1.1% and not more than 30%.

7. The method of producing a secondary battery according to claim 5, wherein the ratio of coverage F is not less than 0.3% and less than 0.4×E %.

8. The method of producing a secondary battery according to claim 5, wherein a ratio of coverage of the adhesive material at the surface Z decreases gradually from the center of the surface Z toward a periphery of the surface Z.

* * * * *